United States Patent
Iwasaki et al.

(10) Patent No.: US 8,437,549 B2
(45) Date of Patent: May 7, 2013

(54) IMAGE PROCESSING METHOD AND IMAGE PROCESSING APPARATUS

(75) Inventors: Masahiro Iwasaki, Kyoto (JP); Arasanathan Thayananthan, Essex (GB); Roberto Cipolla, Cambridge (GB)

(73) Assignee: Panasonic Corporation, Osaka (JP)

( * ) Notice: Subject to any disclaimer, the term of this patent is extended or adjusted under 35 U.S.C. 154(b) by 183 days.

(21) Appl. No.: 12/919,849

(22) PCT Filed: Mar. 14, 2008

(86) PCT No.: PCT/GB2008/000918
§ 371 (c)(1),
(2), (4) Date: Aug. 27, 2010

(87) PCT Pub. No.: WO2009/112790
PCT Pub. Date: Sep. 17, 2009

(65) Prior Publication Data
US 2011/0013840 A1    Jan. 20, 2011

(51) Int. Cl.
*G06K 9/34* (2006.01)
(52) U.S. Cl.
USPC ............. 382/173; 382/107; 382/103; 356/27; 348/208.6
(58) Field of Classification Search .................. None
See application file for complete search history.

(56) References Cited

U.S. PATENT DOCUMENTS

| | | | | |
|---|---|---|---|---|
| 5,016,173 A | * | 5/1991 | Kenet et al. | 382/128 |
| 6,859,554 B2 | * | 2/2005 | Porikli et al. | 382/173 |
| 7,003,156 B1 | * | 2/2006 | Yamamoto et al. | 382/181 |
| 7,142,602 B2 | * | 11/2006 | Porikli et al. | 375/240.16 |

(Continued)

FOREIGN PATENT DOCUMENTS

| | | |
|---|---|---|
| JP | 8-214289 | 8/1996 |
| JP | 11-066319 | 3/1999 |

(Continued)

OTHER PUBLICATIONS

Tenenbaum J B et al, A global geometric framework for nonlinear dimensionality reduction, science, American Association for the advancement of science Washington DC vol. 290, No. 5500, Dec. 22, 2000 p. 2319-2323.*

(Continued)

*Primary Examiner* — Chan S Park
*Assistant Examiner* — Iman K Kholdebarin
(74) *Attorney, Agent, or Firm* — Wenderoth, Lind & Ponack, L.L.P.

(57) ABSTRACT

An image processing apparatus robustly performs segmentation on an image including an object such as a moving person with its deformation. The image processing apparatus includes: an image inputting unit which receives temporally successive images; a motion analyzing unit which calculates motions of blocks using at least two temporally different images and calculates, based on the motions of the blocks, temporal motion trajectories of the blocks in the temporally successive images; a distance calculating unit which calculates a distance indicating a similarity of the motions of the blocks, using a temporal motion trajectory of a block i and a temporal motion trajectory of a block other than the block i calculated by the motion analyzing unit; and a nonlinear space processing unit which projects the distance calculated by the distance calculating unit into a nonlinear space and performs the segmentation on a result of the projection in the nonlinear space.

12 Claims, 17 Drawing Sheets

U.S. PATENT DOCUMENTS

| | | | |
|---|---|---|---|
| 7,508,983 B2* | 3/2009 | Enomoto | 382/173 |
| 8,213,681 B2* | 7/2012 | Nobori et al. | 382/103 |
| 2002/0176625 A1 | 11/2002 | Porikli et al. | |
| 2003/0123704 A1* | 7/2003 | Farmer et al. | 382/103 |
| 2004/0194129 A1 | 9/2004 | Carlbom et al. | |
| 2006/0045349 A1* | 3/2006 | Yamamoto et al. | 382/190 |
| 2007/0043544 A1* | 2/2007 | Song et al. | 703/9 |
| 2008/0112592 A1 | 5/2008 | Wu et al. | |
| 2008/0232687 A1* | 9/2008 | Petersohn | 382/173 |
| 2008/0291285 A1* | 11/2008 | Shimizu | 348/208.6 |
| 2012/0148110 A1* | 6/2012 | Chen | 382/107 |

FOREIGN PATENT DOCUMENTS

| | | |
|---|---|---|
| JP | 2004-519966 | 7/2004 |
| JP | 2007-199864 | 8/2007 |
| JP | 2007-333690 | 12/2007 |
| WO | 02/082821 | 10/2002 |

OTHER PUBLICATIONS

Fabio Cuzzolin et al : Robust spectral 3D Bodypart Segmenation along time, Lecture notes in computer science, springer berlin heidelberg, vol. 4814 Oct. 20, 2007.*

International Search Report issued Dec. 30, 2008 in International (PCT) Application No. PCT/GB2008/000918.

Patent Cooperation Treaty (PCT) Written Opinion of the International Searching Authority issued Dec. 30, 2008 in International (PCT) Application No. PCT/GB2008/000918.

Joshua B. Tenenbaum et al., "*A Global Geometric Framework for Nonlinear Dimensionality Reduction*", Science, vol. 290, Dec. 22, 2000, pp. 2319-2323.

Fabio Cuzzolin et al., "*Robust Spectral 3D-Bodypart Segmentation Along Time*", Human Motion a Understanding, Modeling, Capture and Animation, Lecture Notes in Computer Science, vol. 4814, Oct. 20, 2007, pp. 196-211.

Odest Chadwicke Jenkins et al., "*A Spatio-temporal Extension to Isomap Nonlinear Dimension Reduction*", ACM International Conference Proceeding Series, Proceedings of the Twenty-First International Conference on Machine Learning, vol. 69, 2004.

Gabriel J. Brostow et al., "*Unsupervised Bayesian Detection of Independent Motion in Crowds*", Computer Vision and Pattern Recognition, 2006 IEEE Computer Society Conference on New York, vol. 1, Jun. 17, 2006, pp. 594-601.

Di Zhong et al., "*Long-Term Moving Object Segmentation and Tracking Using Spatio-Temporal Consistency*", International Conference on Image Processing, vol. 2, Oct. 7, 2001, pp. 57-60.

Diana Mateus et al., "*Articulated Shape Matching Using Locally Linear Embedding and Orthogonal Alignment*", IEEE 11$^{th}$ International Conference on Computer Vision, Oct. 1, 2007, pp. 1-8.

P. Anandan, "*A Computational Framework and an Algorithm for the Measurement of Visual Motion*", International Journal of Computer Vision, vol. 2, pp. 283-310, 1989.

Vladimir Kolmogorov et al., "*Computing Visual Correspondence with Occlusions via Graph Cuts*", International Conference on Computer Vision, 2001.

Jianbo Shi et al., "*Good Features to Track*", IEEE Conference on Computer Vision and Pattern Recognition, pp. 593-600, 1994.

Arik Azran et al., "*A New Approach to Data Driven Clustering*", International Conference on Machine Learning, 2006.

* cited by examiner

FIG. 7
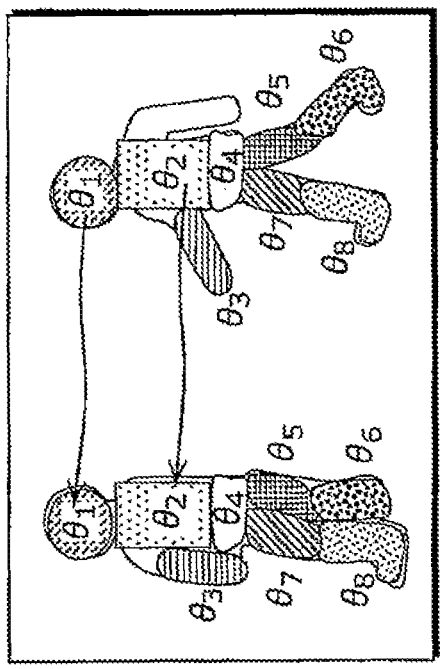
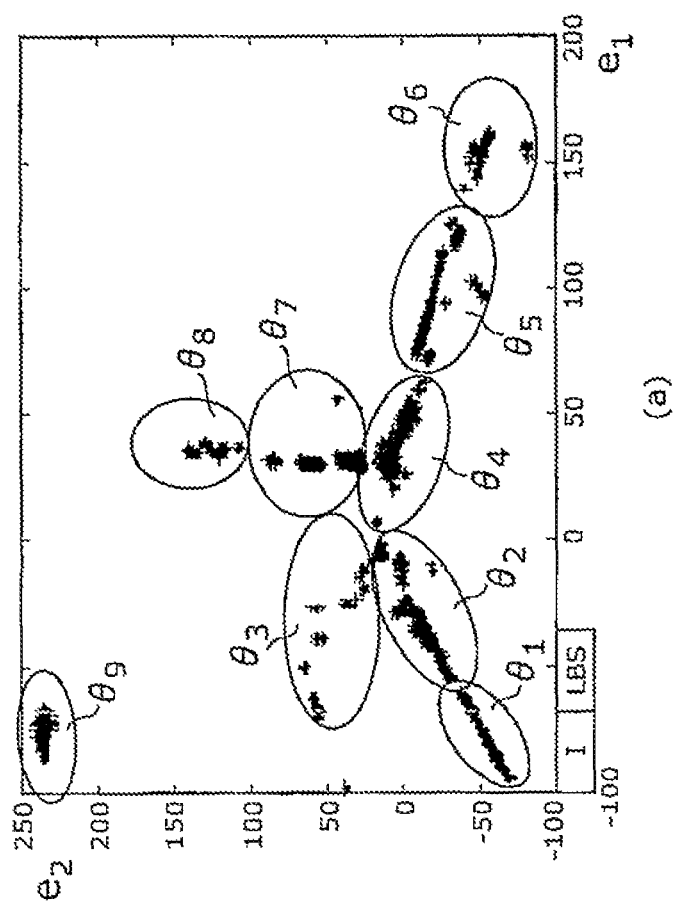

IMAGE PROCESSING METHOD AND IMAGE PROCESSING APPARATUS

TECHNICAL FIELD

The present invention relates to image processing apparatuses and, in particular, to an apparatus which performs segmentation on an image including an object such as a moving person with its deformation, based on motions of blocks, each of which is made up of one or more pixels, in images, so as to detect the object.

BACKGROUND ART

There is a method available by combining a method for extracting candidate regions of a physical object from an image, as a technique for detecting an object such as a moving person with its deformation and performing segmentation on an image including the object, and a method for applying a physical object model prepared in advance to the extracted candidate regions of the physical object. For example, Patent Reference 1 has disclosed the method for extracting a silhouette image of a physical object such as a person from images as a candidate region of the physical object and applying, to the extracted silhouette image, a model for the physical object whose region is parameterized in advance based on knowledge about the physical object. In this way, since a parameterized model can be applied to an object such as a moving person with its deformation, it becomes possible to detect the object and perform segmentation on a region of the object.

Furthermore, Non-Patent Reference 1 has disclosed the method for calculating distances between pixel value data in each image and pixel value data in other images, with images in which a fixed object is captured from angles as inputs, and performing nonlinear dimensionality reduction, with the distances as inputs, to allow images captured from similar angles to be projected such that they are at a short distance in a two-dimensional space. Here, in comparison with the linear dimensionality reduction method such as conventional Principal Component Analysis (PCA), it is shown that reduction to much lower dimension is possible and, further, that handling data nonlinearly-distributed is also possible.

Patent Reference 1: Japanese Unexamined Patent Application Laid-Open Publication No. 8-214289.
Non-Patent Reference 1: Joshua Tenenbaum, Vin de Silva, John Langford, "A Global Geometric Framework for Nonlinear Dimensionality Reduction", Science, VOL290, pp. 2319-2322, 22 Dec., 2000.

DISCLOSURE OF INVENTION

Problems that Invention is to Solve

However, with the technique of the above-mentioned Patent Reference 1, there is a problem that, in a scene where objects such as people come and go, especially in a street or the like, it is impossible to robustly detect an object and perform segmentation on the object. As stated above, the image processing method represented by the above-mentioned Patent Reference 1 requires that a candidate region of each physical object is extracted from the image. When the candidate regions of the physical objects cannot be extracted properly, it becomes impossible to accurately apply a model in which a physical object is parameterized to a candidate region of the physical object. In particular, it is difficult to properly extract the candidate regions of the physical objects in a crowded scene. Further, even when the candidate regions of the physical objects can be extracted properly, there is the following problem. In the case where especially an articulated object such as a person is a physical object, since variation of appearance on an image caused by various postures of the physical object is enormously large, parameterizing a physical object model requires the vast number of parameters. This induces not only an increase in calculation amount but also a mistake in applying a model. Thus, it is difficult to robustly detect an object and perform the segmentation on the object.

On the other hand, the image processing method represented by Non-Patent Reference 1 performs a nonlinear process with distances between pixels as inputs, so as to project image data into an efficiently reduced low-dimensional space. In this way, noise resistance can be expected. However, the main purpose of Non-Patent Reference 1 is to project images into a low-dimensional space so as to visualize a similarity between images, and a method for robustly detecting an object and performing segmentation on the object while corresponding to various posture changes of an articulated object such as a person with its deformation has not been disclosed.

Thus, the present invention has an object of providing an image processing method and an image processing apparatus which can robustly perform segmentation on an image including an object such as a moving person with its deformation.

Means to Solve the Problems

In order to solve the above problems, the present invention is characterized by that an image processing method for performing segmentation on an image including an object whose shape changes, based on motions of blocks, each of which is made up of one or more pixels, in images, the method including: an image receiving step of receiving temporally successive images; a motion analyzing step of calculating the motions of the blocks using at least two temporally different images and calculating, based on the motions of the blocks, temporal motion trajectories of the blocks in the temporally successive images; a distance calculating step of calculating a distance which indicates a similarity of the motions of the blocks, using a temporal motion trajectory of a block i and a temporal motion trajectory of a block other than the block i calculated in the motion analyzing step; and a nonlinear space processing step of projecting the distance calculated in the distance calculating step into a nonlinear space and performing the segmentation on a result of the projection in the nonlinear space.

It should be noted that the present invention can be realized not only as the above-mentioned image processing method but also as the image processing apparatus including the above-mentioned each step, the program causing a computer to execute the above-mentioned each step, the computer-readable recording medium such as a CD-ROM in which the program is stored, and the like.

Effects of the Invention

The above-mentioned method and apparatus can detect an object such as a moving person with its deformation and perform the segmentation on regions. Further, it is also possible to predict a motion of the object, and the like, using a result of the detection and segmentation.

BRIEF DESCRIPTION OF DRAWINGS

FIG. 7 is a diagram showing an example of detection and segmentation performed by the nonlinear space processing unit according to the first embodiment of the present invention.

NUMERICAL REFERENCES

Figure 1:
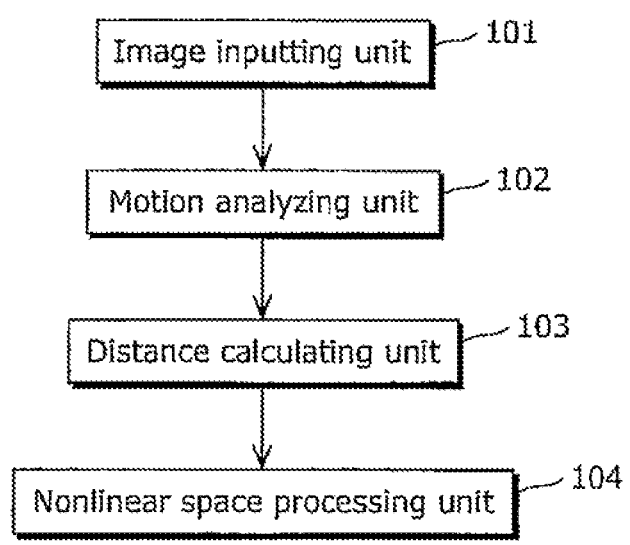
FIG. 1 is a diagram showing a basic structure of an image processing apparatus according to a first embodiment of the present invention.

101 Image inputting unit
102 Motion analyzing unit
103, 103a Distance calculating unit
104, 104a Nonlinear space processing unit
1001 Image displaying unit
1101 Segment region recording and transmitting unit
1201 Object motion predicting unit

BEST MODE FOR CARRYING OUT THE INVENTION

One embodiment of the present invention is that an image processing method for performing segmentation on an image including an object whose shape changes, based on motions of blocks, each of which is made up of one or more pixels, in images, the method including: an image receiving step of receiving temporally successive images; a motion analyzing step of calculating the motions of the blocks using at least two temporally different images and calculating, based on the motions of the blocks, temporal motion trajectories of the blocks in the temporally successive images; a distance calculating step of calculating a distance which indicates a similarity of the motions of the blocks, using a temporal motion trajectory of a block i and a temporal motion trajectory of a block other than the block i calculated in the motion analyzing step; and a nonlinear space processing step of projecting the distance calculated in the distance calculating step into a nonlinear space and performing the segmentation on a result of the projection in the nonlinear space. Based on the motions of the blocks, the segmentation is performed on an object such as a moving person with its deformation, which allows the object in an image to be surely detected.

More preferred embodiment of the present invention is that, in the distance calculating step, using at least two distance functions, two or more distances are calculated for each of the distance functions, each of the distances is projected into respective different nonlinear spaces, and the segmentation is performed by integrating results of the projection. Using distances functions and nonlinear spaces allows more highly accurate segmentation of an image.

More preferred embodiment of the present invention is that, in the distance calculating step, distances each of which indicates a similarity of motions of two blocks are calculated for blocks included in the image, and, in the nonlinear space processing step, respective distances are nonlinearized, the nonlinearized distances are dimensionality-reduced so as to be projected into a nonlinear space, and the segmentation is performed by obtaining one or more segment regions having a similarity with respect to the distances projected into the nonlinear space. With this, it is possible to robustly detect an object such as an especially moving person with its deformation and to perform the segmentation on the object at the same time.

More preferred embodiment of the present invention is that, in the nonlinear space processing step, the nonlinearization is performed by converting Euclidean distances into geodesic distances. With this, it is possible to robustly detect an object such as especially a moving person with its deformation and to perform the segmentation on the object at the same time.

More preferred embodiment of the present invention is that, in the nonlinear space processing step, the dimensionality reduction is performed by calculating an eigenvector of the nonlinearized distances.

Allowing an estimated error of motions of pixels enables robust detection of an object such as a moving person with its deformation and at the same time segmentation of the object.

More preferred embodiment of the present invention is that, in the nonlinear space processing step, the dimensionality reduction is performed, after the nonlinearization is performed by infinitizing distances except for N distances nearest to the block i. Since distances that are selected and those that are not selected are to be in a nonlinear relation, it becomes possible to reduce motions of an articulated object such as a person highly efficiently and accurately.

More preferred embodiment of the present invention is that, in the nonlinear space processing step, the dimensionality reduction is performed, after the nonlinearization is performed by infinitizing distances among distances to the block i which are greater than a threshold. Since distances that are selected and those that are not selected are to be in a nonlinear relation, it becomes possible to reduce motions of an articulated object such as a person highly efficiently and accurately.

More preferred embodiment of the present invention is that, in the nonlinear space processing step, the dimensionality reduction is performed, after the nonlinearization is performed by multiplying distances to the block i by exponential functions including a nonlinear function. Since distances that are selected and those that are not selected are to be in a nonlinear relation, it becomes possible to reduce motions of an articulated object such as a person highly efficiently and accurately.

More preferred embodiment of the present invention is that, in the motion analyzing step, one of a two-dimensional motion vector and an affine parameter is calculated as the motions of the blocks. Analyzing motions of blocks with a motion vector or an affine parameter allows temporal motion trajectories of the blocks to be calculated.

More preferred embodiment of the present invention is that, in the distance calculating step, the distance which includes at least one of a distance between blocks on the image and an angle between blocks on the image is calculated in addition to the similarity of the motions of the blocks. With this, it becomes possible to efficiently capture motions of a moving physical object such as a person whose shape changes with a rotational motion pivoting on a joint.

One embodiment of the present invention is that the image processing method includes an image displaying step of displaying, on the image received in the image receiving step, a result of the segmentation performed in the nonlinear space. Displaying regions on which segmentation is performed on an image can be applied to style reforms in sports, correction of walking in rehabilitation, and the like.

One embodiment of the present invention is that, in the nonlinear space processing step, at least two different moving physical bodies included in the image received in the image receiving step are detected based on a result of the segmentation performed in the nonlinear space. Detection in a nonlinear space allows moving physical bodies to be detected robustly.

One embodiment of the present invention is that the image processing method further includes an object motion predicting step of calculating a representative trajectory from temporal motion trajectories of blocks included in each segment obtained by the segmentation, based on a result of the segmentation performed in the nonlinear space, and predicting motion of an object according to the representative trajectory. Motion prediction with high noise resistance becomes possible by predicting motions of an object using a representative trajectory among temporal motion trajectories of blocks.

One embodiment of the present invention is that the image processing method further includes a recording and transmitting step of identifying a segment on the image received in the image receiving step, based on a result of the segmentation performed in the nonlinear space, and recording or transmitting the result corresponding to the identified segment. Separately holding respective segments of a detected object included in an image allows necessary segments to be selected from the segments, recorded, and outputted to the outside. As a result, efficient recording and outputting of the segments as graphic elements become possible. Therefore, it operates effectively in the case where the segments are recorded in and transmitted to devices having a limited processing capability such as a mobile telephone.

The following describes embodiments of the present invention with reference to the drawings.

First Embodiment

FIG. 1 is a diagram showing a structure of an image processing apparatus according to a first embodiment of the present invention. The image processing apparatus shown in FIG. 1 is an image processing apparatus which robustly performs segmentation on an image including an object such as a moving person with its deformation, based on motions of blocks, each of which is made up of one or more pixels, in images, so as to surely detect the object in the image, and includes: an image inputting unit 101; a motion analyzing unit 102; a distance calculating unit 103; and a nonlinear space processing unit 104.

The image inputting unit 101 is a processing unit which receives temporally successive images and, for example, is a video camera or a communication interface connected to a video camera.

The motion analyzing unit 102 is a processing unit which calculates motions of blocks using at least two temporally different images selected from among the images received by the image inputting unit 101 and tracks movements of the blocks based on the calculated motions of the blocks in the temporally successive images, so as to calculate temporal motion trajectories of pixels.

The distance calculating unit 103 is a processing unit which calculates distances including a similarity of the motions of the blocks using a temporal motion trajectory of a block i and temporal motion trajectories of blocks other than the block i calculated by the motion analyzing unit 102, so as to capture deformation of a moving object. For example, in the case where temporal motion trajectories of N blocks are used, distances to be calculated are an N×N distance matrix. Here, it is possible to express, as a distance matrix, an object whose motion changes distances between blocks, especially a motion of an object such as a moving person with its deformation like an articulated object, by calculating distances each of which evaluates the similarity of the motions of the blocks. As stated above, "distance" in the present Description is not only a distance between two points in a two-dimensional space but includes a mathematical distance between multidimensional data, and is a value or a set of values (distance matrix).

The nonlinear space processing unit 104 is a processing unit which first performs a nonlinear process on the distance matrix calculated by the distance calculating unit 103, then projects the distance matrix calculated by the distance calculating unit 103 into a reduced space (that is, a nonlinear space), and performs detection and segmentation in the reduced nonlinear space. In particular, since the nonlinear space processing unit 104 can reduce shape information of a moving physical body with its deformation like an articulated object to a low-dimensional space more properly by an effect of the nonlinear process and dimensionality reduction, the nonlinear space processing unit 104 can detect an object in an image and perform the segmentation on the image robustly with low calculation amount.

It should be noted that each component included in the image processing apparatus (the image inputting unit 101, the motion analyzing unit 102, the distance calculating unit 103, and the nonlinear space processing unit 104) may be realized by software such as a program executed in a computer having a CPU, a RAM, a ROM, a communication interface, an I/O port, a hard disk, a display, and the like or by hardware such as electric circuitry. Hereinafter, the same applies to an image processing apparatus according to other embodiments.

Figure 2:
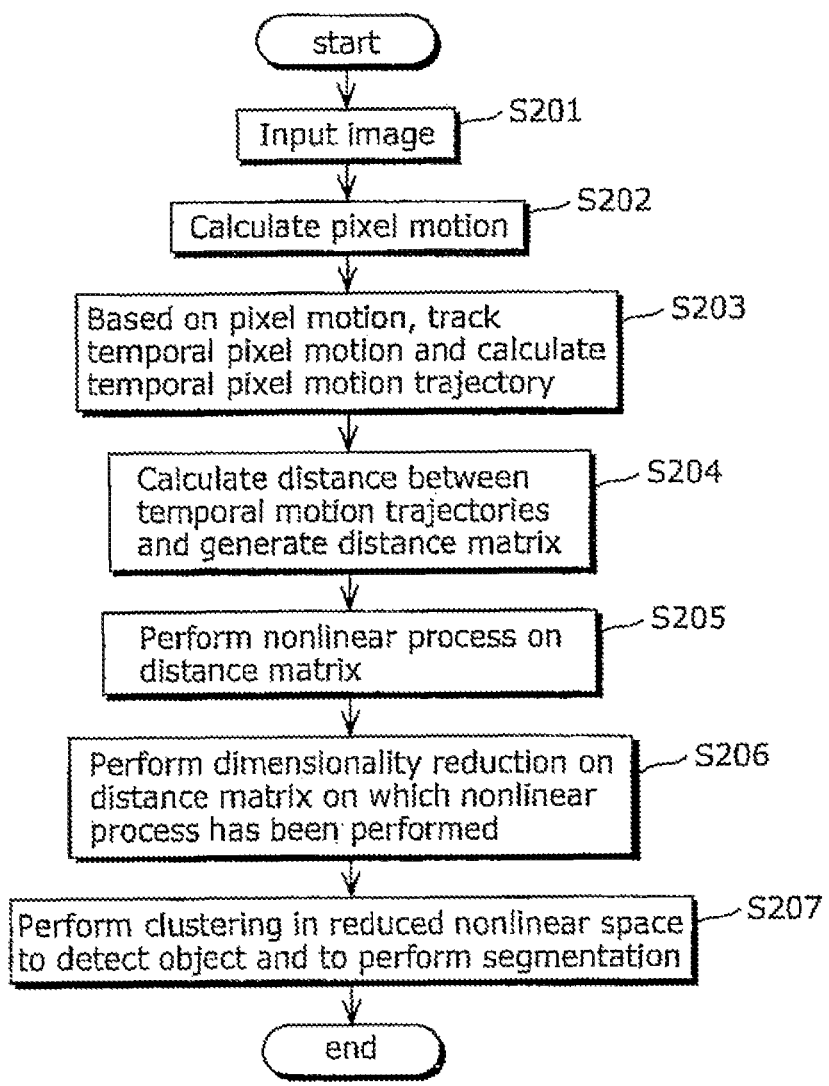
FIG. 2 is a flow chart showing a basic operation of the image processing apparatus according to the first embodiment of the present invention.

Regarding the image processing method of the present invention, the following describes in detail an example of detecting an object and performing segmentation on the object, using the flow chart shown in FIG. 2.

First, in step S201, the image inputting unit 101 receives input images.

Next, in step S202, the motion analyzing unit 102 calculates motions of blocks using at least two input images. It should be noted that, here, as an example of calculating the motions of the blocks, motions of pixels are calculated. Hereinafter, in the present embodiment, as an example of block-by-block processing, pixel-by-pixel processing will be described. In the case of performing the block-by-block processing where a block is made up of pixels, data (representative value) corresponding to a block is obtained by summing data corresponding to a pixel for the number of blocks or by calculating an average value for the number of blocks, and the processing may be performed using the obtained representative value in the same manner as the pixel-by-pixel processing.

First, an example of calculating the motions of the pixels by optical flow computation will be described. Non-Patent Reference 2 or Non-Patent Reference 3 can be used for calculating a motion vector by the optical flow computation.

Non-Patent Reference 2: P. Anandan, "A Computational Framework and an Algorithm for the Measurement of Visual Motion", International Journal of Computer Vision, Vol. 2, pp. 283-310, 1989.

Non-Patent Reference 3: Vladimir Kolmogorov and Ramin Zabih, "Computing Visual Correspondence with Occlusions via Graph Cuts", International Conference on Computer Vision, 2001.

For example, when it is assumed that T images are inputted in step S201, a motion vector $(u_t^i, v_t^i)$ of a pixel i is estimated using images inputted at time t and time t+1. Here, the images inputted are not necessarily temporally successive, and, for example, motions of pixels may be calculated using images inputted at time t and time t+n.

Note that n is an integer equal to or more than 1. Further, instead of the motion vector, an affine parameter may be estimated as the motions of the pixels. At this time, motion information regarding all pixels may be obtained. Furthermore, in the case where it is desired to perform a process at higher speed, an image is divided into a grid and motion information of only pixels on the grid at regular intervals may be obtained or, as mentioned above, an image is divided into blocks and motion information may be obtained on a block-by-block basis. Further, in the case of calculating a motion vector using Non-Patent Reference 2, since its degree of reliability can be calculated, only pixels having motion information with high degree of reliability may be used. Moreover, in the case of calculating a motion vector using Non-Patent Reference 3, occlusion can be estimated. Thus, only motion information of pixels not occluded may be used.

Further, instead of a method for calculating a motion vector based on an assumption of a translation movement of a block, a method for calculating a motion vector based on an assumption of an affine transformation of a block may be used as a method for calculating the motions of the pixels. Non-Patent Reference 4 can be used for the method for calculating the motion vector based on the assumption of the affine transformation.

Non-Patent Reference 4: Jianbo Shi and Carlo Tomosi, "Good Features to Track", IEEE Conference on Computer Vision and Pattern Recognition, pp. 593-600, 1994.

The above method estimates an affine parameter A; equivalent to a motion adjacent to the pixel i of images respectively inputted at time t and time t+1. Regarding the pixel i, pixel locations and $x_t^i$, $x_{t+1}^i$, on the images of time t and time t+1 have the following relation.

$$x_{t+1}^i = A_t^i X_t^i \qquad \text{Equation 1}$$

The above method can estimate a motion of the pixel i with respect to especially a rotating object more highly accurately than the case of using the method for calculating the motion vector based on the assumption of the translation movement.

Figure 3:
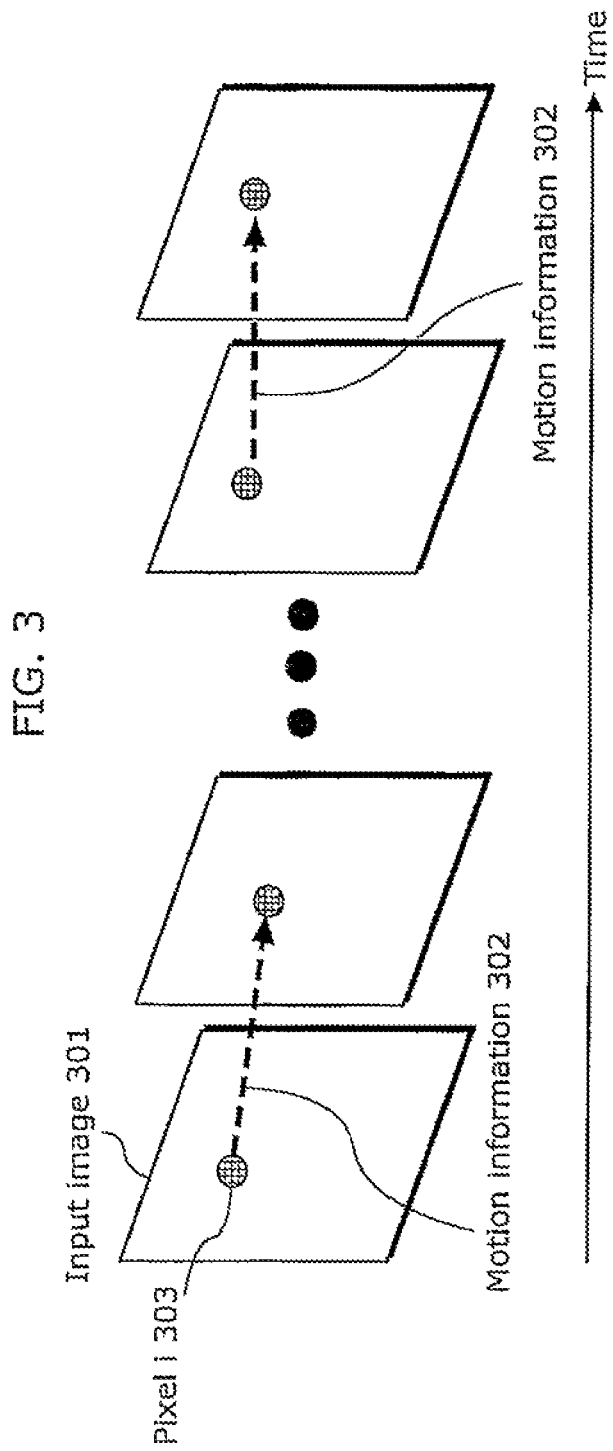
FIG. 3 is a diagram showing a process example of a motion analyzing unit according to the first embodiment of the present invention.

Next, in step S203, the motion analyzing unit 102 calculates the temporal motion trajectory of the pixel i from the motion of the pixel i with respect to temporally successive images, using the motion information calculated in step S202. As shown in FIG. 3, the motion of the pixel i is tracked using motion information 302 calculated, in step S202, from a motion of a pixel i 303 of an input image 301 at time t. The temporal motion trajectory of the pixel i is calculated, using a pixel location $(x_t^i, y_t^i)$ on the image at time t when the pixel i passes, by $$x^i = (x_1^i, y_1^i, \ldots, x_t^i, y_t^i, \ldots, x_T^i, y_T^i) \qquad \text{Equation 2}$$

where T is the number of images used for calculating the temporal motion trajectory.

Next, in step S204, the distance calculating unit 103 calculates a distance matrix including a similarity of motions of pixels using the temporal motion trajectory of the pixel i calculated by Equation 2. A linear distance between the pixel i and a pixel j f (I, j) can be calculated by $$f(i,j) = \text{mean}_{ij} + w \cdot \sqrt{\text{var}_{ij}} \qquad \text{Equation 3}$$

where w is a weighting factor and a parameter set by a designer.

Furthermore, the following expresses $\text{mean}_{ij}$ and $\text{var}_{ij}$ $$\text{mean}_{ij} = \frac{1}{T} \sum_{i=1}^{T} d'_{ij} \qquad \text{Equation 4}$$

$$\text{var}_{ij} = \frac{1}{T} \sum_{i=1}^{T} (d'_{ij} - \text{mean}_{ij})^2 \qquad \text{Equation 5}$$

where $$d_{ij}^t = \sqrt{(x_t^i - x_t^j)^2 + (y_t^i - y_t^j)^2} \qquad \text{Equation 6}$$

As mentioned above, as shown by Equation 3, in addition to a time average value of the distance between the pixels shown by Equation 4, a time fluctuation component of the distance between the pixels shown by Equation 5 is made an element for the linear distance f (i, j). Especially, the fluctuation component of the distance between the pixels shown by Equation 5 indicates the similarity of the motions of the pixels, and this enables not only a rigid body in which a relation of distances between pixels does not change but also deformation which is caused by an articulated object and the like to be captured.

Next, in step S205, the nonlinear space processing unit 104 performs a nonlinear process on the linear distance f (i, j) calculated by Equation 2 as follows $$g(i, j) = \begin{cases} f(i, j) & \text{if } i \text{ is } K - NearestNeighbor \\ \infty & \text{otherwise} \end{cases} \qquad \text{Equation 7}$$

where, when attention is focused on the pixel i, K pixels j are selected in ascending order from linear distances to the pixel i, distances to the selected pixels j are not changed, and distances to the non-selected pixels j are changed to infinity. Here, although the linear distances are selected in ascending order, a threshold TH may be set by $$g(i,j) = \begin{cases} f(i,j) & \text{if } f_x(i,j) < TH \\ \infty & \text{otherwise} \end{cases} \quad \text{Equation 8}$$

Further, the linear distances may be nonlinearized, using an exponential function, by $$g(i,j) = \exp\left(-\frac{f(i,j)}{\sigma}\right) \quad \text{Equation 9}$$

where a designer gives σ.

Next, a distance is updated using the nonlinearized distance g(i, j) as in the following equation.

Regarding the nonlinearization of distance, it is not limited to the above function, and anything which performs nonlinear conversion on the distance between the pixel i and the pixel j is acceptable.

Next, a geodesic distance is calculated as follows $$g_{new}(i,j) = \min(g(i,j), g(i,k) + g(k,j)) \quad \text{Equation 10}$$

Note that min (x, y) is a function which returns a smaller value between value x and value y.

Figure 4:
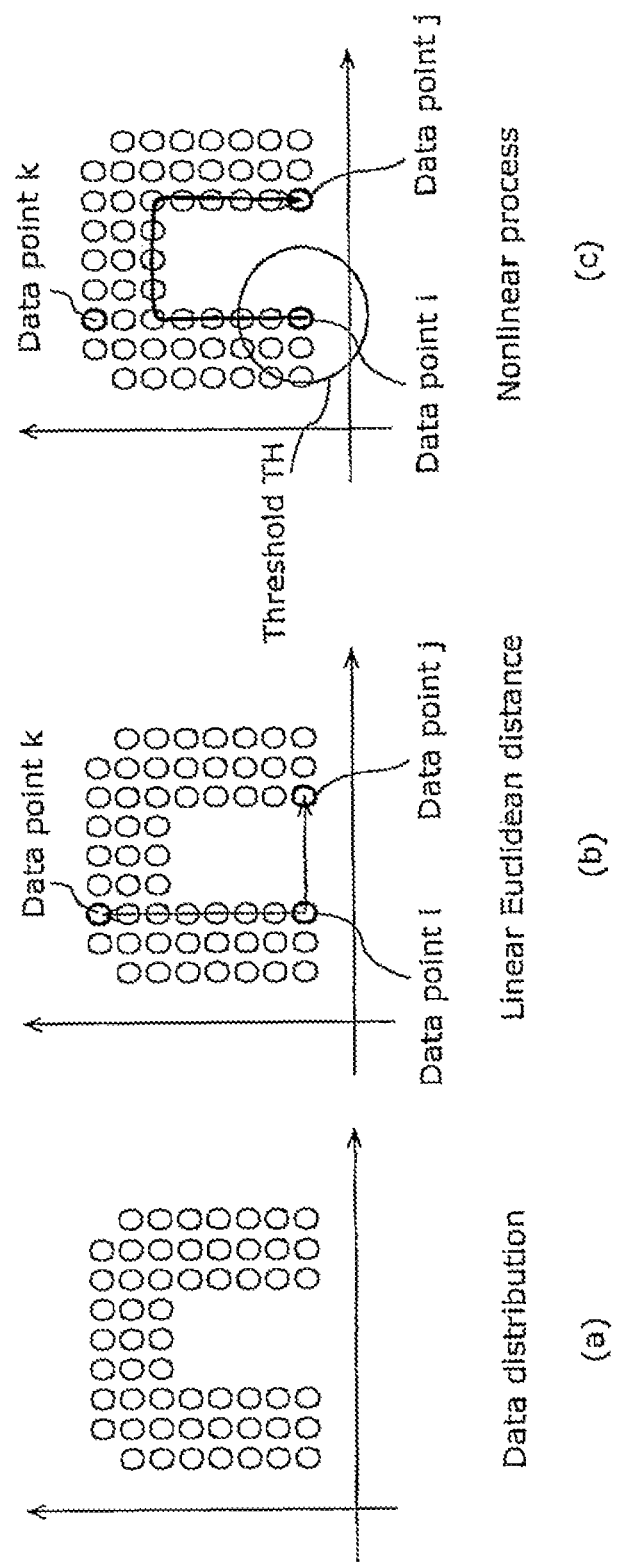
FIG. 4 is a conceptual diagram showing an effect of a nonlinear space processing unit according to the first embodiment of the present invention.

Here, the nonlinear process shown by Equations 7 to 10 will be described with reference to the conceptual diagram of FIG. 4(a) to (c). Although Equation 8 is described here, it can be expected that performing other nonlinear processes brings about the same effect. First, a left diagram (a) of FIG. 4 shows a two dimensional data distribution. Here, respective data points are equivalent to the temporal motion trajectory of the pixel i shown by Equation 3. In the case where the nonlinear process shown by Equations 7 to 10 is not performed, as shown in a central diagram (b) of FIG. 4, a distance between a data point i and a data point j becomes smaller than a distance between the data point i and a data point k. However, as shown in a right diagram (c) of FIG. 4, for example, when the processes shown by Equations 8 and 10 are performed, the distance between the data point i and the data point j is not a Euclidean distance but is a distance, referred to as a geodesic distance, over which an arrow tracks the data points. As a result, it differs from the case of using the Euclidean distance, and the distance between the data point i and the data point j becomes greater than the distance between the data point i and the data point k.

Figure 5:
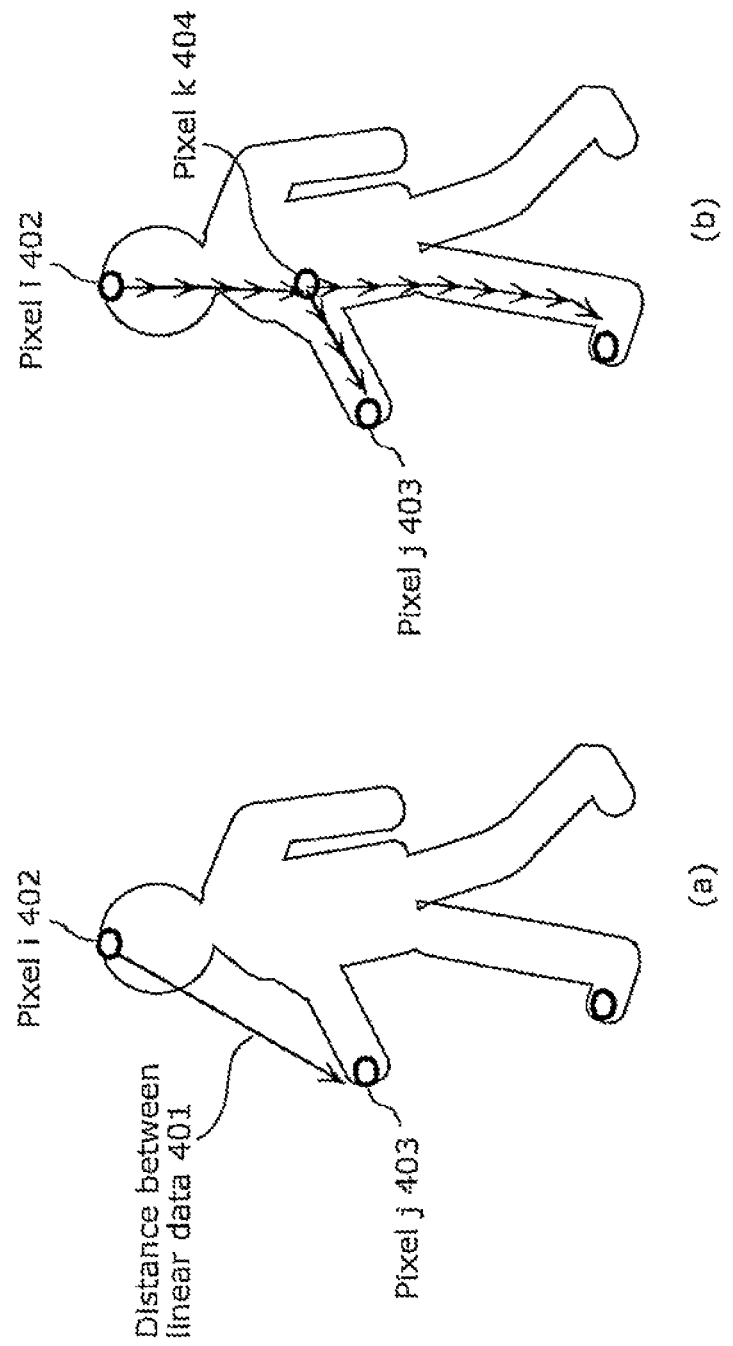
FIG. 5 is a diagram showing an example of the effect of the nonlinear space processing unit according to the first embodiment of the present invention.

Next, validity of performing the nonlinear process shown by Equations 7 to 10 will be described with reference to the conceptual diagram of FIG. 5(a) and (b). Here, to describe a difference between the linear distance f(i, j) and the nonlinearized distance $g_{new}(i, j)$ clearly, as shown by Equation 6, the distance between the pixels at time t is used as an example. Actually, in addition to the distance between the pixels, as shown by Equation 3, when the fluctuation component of the distance between the pixels is used as the similarity of the motions of the pixels, not only can a shape of an articulated object and the like but also its deformation be captured. FIG. 5(a) shows an example where the processes shown by Equations 7 to 10 are not performed. For example, a distance between a pixel i 402 of a head and a pixel j 403 of a hand is a distance shown by a linear distance 401. On the other hand, when the nonlinear process shown by Equations 7 to 10 is performed, as shown in FIG. 5(b), the distance between the pixel i 402 of the head and the pixel j 403 of the hand is a distance as linear sum shown by an arrow tracking via a pixel k 404 to the pixel j. Consequently, a shape of an articulated object such as a person cannot be expressed with the linear distance 401, whereas it, by contrast, allows shapes of joints to be expressed as distances. It should be noted that a method for calculating the geodesic distance is not limited to Equation 10.

Next, in step S206, the nonlinear space processing unit 104 performs dimensionality reduction on the nonlinearized distance matrix calculated in step S205. The dimensionality reduction can be realized by obtaining Eigensystem after performing Young-Householder transformation. This is a method for efficiently projecting data distributed in a multi-dimensional space into a low-dimensional space, and can express robust data with respect to input data noise (here, equivalent to a case where an error is included in the motion information of the pixel i at a time of calculating the temporal motion trajectory of the pixel i using Equation 2).

In other words, the nonlinearized distance matrix is expressed as $$G = \{g_{new}(i,j)\}, \quad \text{Equation 11}$$

and the Young-Householder transformation in which G in Equation 11 is multiplied by a centering matrix H on both sides is performed as follows. The distance matrix includes a distance between points, whereas this is, by contrast, for transforming to a distance matrix having a gravity center as origin.

$$\tau(G) = \frac{HG^{(2)}H}{2} \quad \text{Equation 12}$$

Note that H is the centering matrix, and is expressed by $$H_{ij} = (I - 1/N) \quad \text{Equation 13}$$

i is a unit matrix, and N is the number of temporal motion trajectories of pixels i shown by Equation 2.

Moreover, $$G^{(2)} = \{g_{new}(i,j)^2\} \quad \text{Equation 14}$$

Next, to perform the dimensionality reduction, P eigenvectors $e_p$ corresponding to τ(G) and an eigenvalue $\lambda_p$ corresponding to τ(G) are calculated.

In this way, based on Equation 10, when $$g_{new}^i = (g_{new}(i,0), g_{new}(i,1), \ldots, g_{new}(i,N)) \quad \text{Equation 15}$$

is assumed, a result of projecting $g_{new}^i$ into a dimensionality-reduced space can be expressed as data $z_p^i$ by $$z_p^i = \sqrt{\lambda_p e_p^i} \quad \text{Equation 16}$$

Note that $e_p^i$ is an $i^{th}$ element of a $p^{th}$ eigenvector $e_p$. P which is the number of eigenvectors may be experimentally determined according to a scene to be used or may be determined based on a contribution ratio $\alpha_p$ after the contribution ratio is calculated from the eigenvalue $\lambda_p$ as follows $$a_p = \frac{\sum_{p=1}^{P} \lambda_p}{\sum_{p=1}^{N} \lambda_p} \quad \text{Equation 17}$$

P is the number of eigenvectors to be used, that is, the number of dimensions of a reduced space. N is the number of all of the eigenvectors. Thus, P at time which the contribution ratio $\alpha_p$ is equal to or more than a constant value may be the number of eigenvectors.

As stated above, with the processes shown by Equations 2 to 16, the temporal motion trajectories of the pixels i as shown by Equation 2 can be associated with data in a space that is dimensionality-reduced to be nonlinear by the eigenvector $e_p$.

Figure 6:
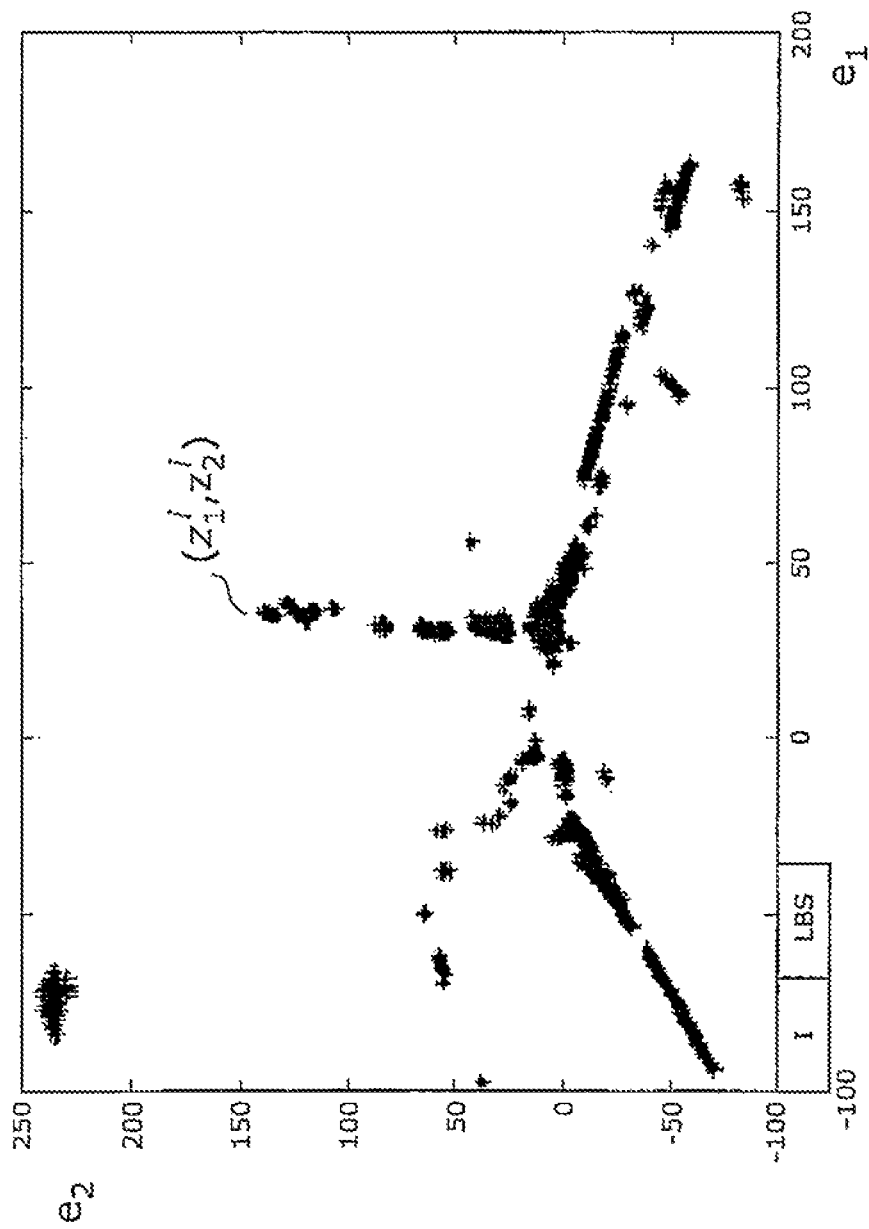
FIG. 6 is a diagram showing an example of dimensionality reduction performed by the nonlinear space processing unit according to the first embodiment of the present invention.

FIG. 6 shows, in the case where an image in which a person is walking is inputted, a result of projecting, into a space, the temporal motion trajectories of the pixels i which are dimensionality-reduced to be nonlinearly. The horizontal axis is an eigenvector $e_1$, and the vertical axis is an eigenvector $e_2$. A point $(z_1^i, z_2^i)$ projected two-dimensionally is $g_{new}^i$ projected. Here, since data $z_p^i$ in a nonlinear space and temporal motion trajectories $x^1$ of pixels i are in a one-to-one corresponding relation, it can be thought that $(z_1^i, z_2^i)$ corresponds to a temporal motion trajectory $x^1$ of a pixel i. It should be noted that, although the number of dimensions of the nonlinear space is two-dimensional so as to visualize a result, as mentioned before, it is not necessary two-dimensional, and it is possible to project data at higher accuracy with more number of dimensions.

Next, in step S207, the nonlinear space processing unit 104 detects an object and performs segmentation on the object by clustering data projected into the reduced nonlinear space in step s206 as shown in FIG. 6.

First, a segment region is expressed by $$\theta = \{\theta_1, \ldots, \theta_m, \ldots, \theta_M\} \quad \text{Equation 18}$$

where M is the number of segment regions and empirically determined according to a scene to be used.

Each segment region $\theta_m$ is expressed by parameters $z_m, Z_m$. Here, $z_m$ is an average value of coordinates of data belonging to the segment $\theta_m$ in the reduced nonlinear space, and $Z_m$ is a dispersion matrix regarding the coordinates of the data belonging to the segment $\theta_m$.

An initial value of $z_m$ may be randomly determined or coordinates of an intersection obtained by dividing the reduced nonlinear space into a grid may be set as the initial value.

Note that $z_m, Z_m$ can be expressed by $$\overline{z_m} = \begin{bmatrix} \overline{z_1^m} \\ \vdots \\ \overline{z_p^m} \end{bmatrix} \quad \text{Equation 19}$$

$$Z_m = \frac{1}{C_m} \sum_{c_m=1}^{C_m} \begin{bmatrix} z_1^{c_m} - \overline{z_1^m} \\ \vdots \\ z_p^{c_m} - \overline{z_p^m} \end{bmatrix} \begin{bmatrix} z_1^{c_m} - \overline{z_1^m} & \cdots & z_p^{c_m} - \overline{z_p^m} \end{bmatrix} \quad \text{Equation 20}$$

where $C_m$ is the number of data belonging to the segment region $\theta_m$ in the reduced nonlinear space.

The following describes a specific calculation method. First, the segment region $\theta_m$ to which data $z_i$ in the reduced nonlinear space belongs is obtained using the following distance function $$\psi_m(z_i) = \phi_m(z_i) = 1n|Z_m| - 1np(\omega_w) \quad \text{Equation 21}$$

where $\psi_m(z_i)$ shows a distance between the data $z_i$ in the nonlinear space corresponding to the temporal motion trajectory of the pixel i and each segment $\theta_m$. Each data comes to belong to a segment region $\theta_m$ where $\psi_m(z_i)$ is the minimum value. Note that $\phi_m(z_i)$ is a Mahalanobis distance, and $$\phi_m(z_i) = (z_i - \overline{z_m})^t Z_m^{-1} (z_i - \overline{z_m}) \quad \text{Equation 22}$$

Moreover, $\phi_m(z_i)$ may be used instead of $\psi_m(z_i)$.

Further, $p(\omega_m)$ may be a constant value, and in the case of performing segmentation on a routine object such as a person, it may be set based on shapes of body regions, area ratios, and the like. $\omega_m$ is a weighting factor for the segment region $\theta_m$.

Next, based on a result of calculation by Equation 21, the parameters $\overline{z_m}, Z_m$ of the segment region $\theta_m$ are updated using the data $z_i$ belonging to the segment region $\theta_m$ as follows $$\overline{z_m} = \frac{\sum_{c_m=1}^{C_m} \omega_{c_m} z_{c_m}}{\sum_{c_m=1}^{C_m} \omega_{c_m}} \quad \text{Equation 23}$$

$$Z_m = \frac{\sum_{c_m=1}^{C_m} \omega_{c_m}(z_{c_m} - \overline{z_m})(z_{c_m} - \overline{z_m})^t}{\sum_{c_m=1}^{C_m} \omega_{c_m}^2} \quad \text{Equation 24}$$

where $z_{c_m}$ is data which belongs to the segment region $\theta_m$ in the reduced nonlinear space. Moreover, $\omega=1$ may be accepted or $\omega$ may be adjusted depending on deviation from an average value of input data. As stated above, repeating the distance calculation and parameter update using Equations 21 to 24 a fixed number of times allows the segment region $\theta_m$ to which each data in the nonlinear space belongs to be obtained. It should be noted that, in addition to the above, other clustering methods such as k-mean and competitive learning may be used. FIG. 7(a) and (b) shows an example of performing segmentation on data in a nonlinear space, assuming M=9, in the case of using, as an input, an image in which a person is walking. When respective correspondences of segment regions $\theta_1$ to $\theta_9$ in the reduced nonlinear space are viewed on the image, $\theta_1$ corresponds to a person's head, $\theta_2$ corresponds to an upper torso, $\theta_3$ corresponds to an arm, $\theta_4$ corresponds to a lower torso, $\theta_5$ and $\theta_7$ correspond to a thigh, and $\theta_6$ and $\theta_8$ correspond to a crus. Note that $\theta_9$ corresponds to part of a background.

Here, as shown by arrows in FIG. 7(b), what corresponds to the segment regions in the reduced nonlinear space is not only regions on one image but also a result of tracking pixels over temporally successive images. That is to say, performing the segmentation in the reduced nonlinear space allows detection of an object (regions of an object) in an image and segmentation of the image including the object as a result of temporally tracking regions of a physical body moving in the image. Furthermore, since it is not necessary to set candidate regions of a person as preprocessing, there is no failure in segmentation caused by a mistake in detecting the candidate regions of the person. As mentioned above, without requiring fitting of a vast number of parameters, clustering in the nonlinear space allows the segmentation of the image including a moving person with its deformation so that the object in the image can be detected robustly.

First Modification of First Embodiment

Next, an example where the segmentation in the nonlinear space is performed according to the first embodiment so as to detect objects will be described as a first modification of the first embodiment. In the first embodiment, the method for performing the segmentation on the regions of the person in the image in which the person is walking has been described. As shown in FIG. 1, the present image processing apparatus includes the image inputting unit 101, the motion analyzing unit 102, the distance calculating unit 103, and the nonlinear space processing unit 104. As its structure is same as in the first embodiment, a description of the structure is not given here. In the first modification, a method for detecting objects by changing parameters with the same method as in the first embodiment will be described. Specifically, a value of K when using Equation 7 or a value of TH when using Equation 8 is set to a larger value than when performing segmentation on regions is intended, using either Equation 7 or Equation 8.

Figure 8:
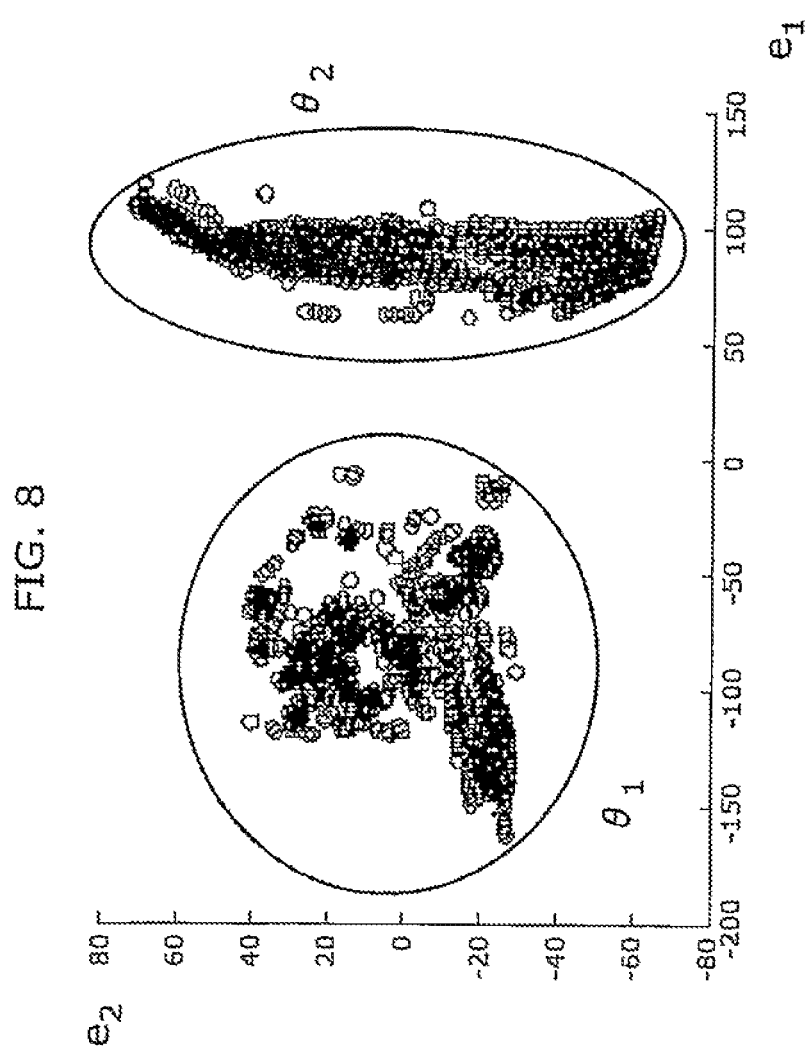
FIG. 8 is a diagram showing an example of detection and segmentation performed by a nonlinear space processing unit according to a first modification of the first embodiment of the present invention.

FIG. 8 shows an example of a result of segmentation in a reduced nonlinear space, assuming M=2, in the case of using, as an input, an image in which a person is walking and a bicycle is running. Correspondences of segment regions $\theta_1$ and $\theta_2$ in the reduced nonlinear space will be described. The segment region $\theta_1$ corresponds to a motion of the bicycle on the image, and the segment region $\theta_2$ corresponds to walk by the person on the image. As stated above, performing the segmentation in the low-dimensional reduced space allows the motion of the bicycle and the motion of the person to be simply and robustly detected separately (that is, segmentation).

It should be noted that, as shown by Equation 2, since temporal motion trajectories of motionless pixels are not used as inputs here, only two moving articulated bodies, the walking person and the bicycle, are projected into the nonlinear space. As a matter of course, the temporal motion trajectories of the motionless pixels may be used as the inputs.

Here, what corresponds to the segment regions in the reduced nonlinear space as in the first embodiment is not only regions on one image but also a result of tracking pixels over temporally successive images. That is to say, performing segmentation in the reduced nonlinear space allows detection of each physical body as a result of temporally tracking regions of physical bodies moving in the image. Furthermore, since it is not necessary to set candidate regions of a person as preprocessing, there is no failure in segmentation caused by a mistake in detecting the candidate regions of the person. As described above, partially changing parameters allows the robust detection and segmentation of moving objects.

Second Modification of First Embodiment

Next, a method for realizing segmentation in a nonlinear space different from the first embodiment will be described as a second modification of the first embodiment. As shown in FIG. 1, the present image processing apparatus includes the image inputting unit 101, the motion analyzing unit 102, the distance calculating unit 103, and the nonlinear space processing unit 104. As its structure is same as in the first embodiment, a description of the structure is not given here. In the second modification, the nonlinear space processing unit 104 performs segmentation in a nonlinear space with the method different from the first embodiment. Here, a method with which the nonlinear space processing unit performs a process in the nonlinear space based on the method disclosed in Non-Patent Reference 5 will be described.

Non-Patent Reference 5: Arik Azran, Zoubin Ghahramani, "A New Approach to Data Driven Clustering", International Conference on Machine Learning, 2006.

Figure 9:
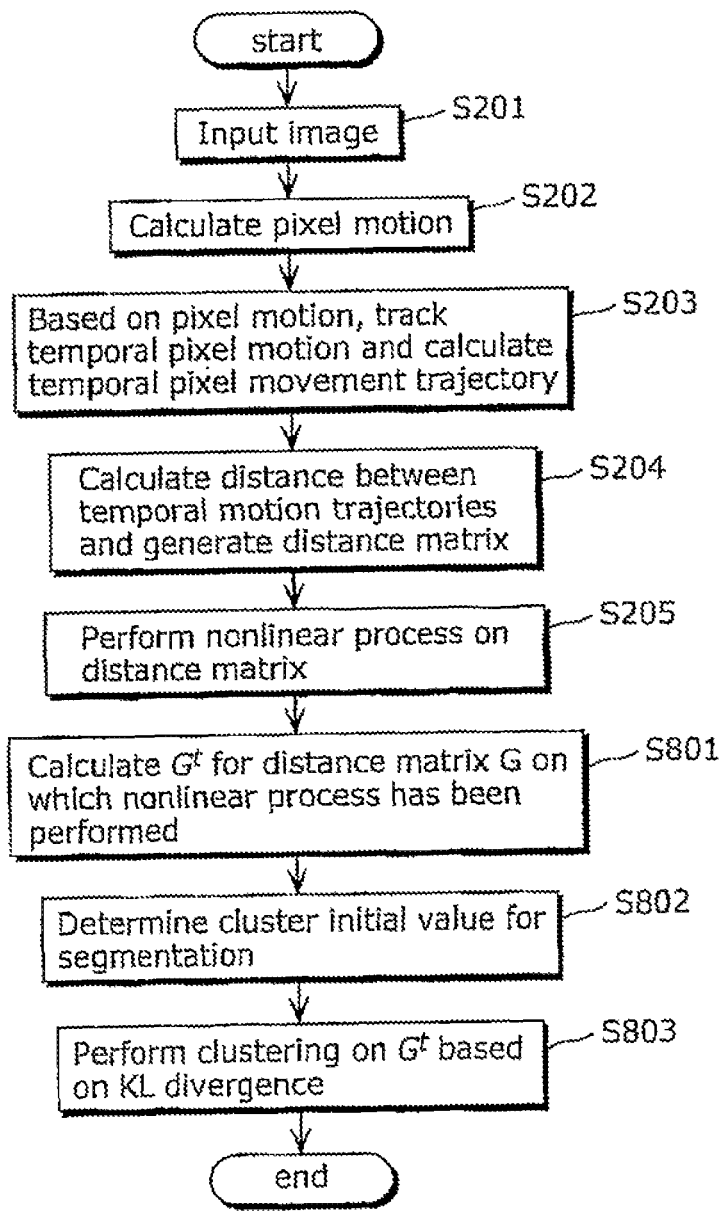
FIG. 9 is a flow chart showing a basic operation of an image processing apparatus according to a second modification of the first embodiment of the present invention.

FIG. 9 is a flow chart showing processing according to the second modification of the first embodiment of the present invention. As steps S201 to S206 are same as in the first embodiment, their descriptions are not given here.

In step S801, the nonlinear space processing unit 104 performs the following normalization process on the nonlinearized distance g(i, j) on which any process shown by Equations 7 to 10 has been performed.

$$G_{ij} = \frac{g(i, j)}{\sum_{j=1}^{N} g(i, j)} \qquad \text{Equation 25}$$

where N is the number of temporal motion trajectories of pixels i shown by Equation 2. And where G represents a similarity between data. Next, the following calculation is performed on normalized G.

$$\Omega = G^t \qquad \text{Equation 26}$$

As a result of performing this calculation, in the case where $G_{ij}$ is a small value, that is, the similarity between data is small, it becomes a smaller value, and in the case where $G_{ij}$ is a large value, it becomes a larger value. In other words, a distance between data having a high similarity becomes dominant. This allows the following process to be performed robustly.

Regarding t, for example, matrices $\Omega^r$ are prepared, such as $\Omega^1 = G^{t1}, \ldots \Omega^r = G^{tr} \ldots \Omega^R = G^{tR}$ (note that t1<tr<tR), and it is desirable that calculation of each $\Omega^r$ is performed separately from step S802 to step S803. Moreover, since a method for performing calculation of Equation 26 at high speed is described in Non-Patent Reference 4, it may be used.

Next, in step S802, the nonlinear space processing unit 104 sets an initial value of a cluster $Q_m$ so as to perform clustering for performing the segmentation. Here, a cluster number is M. Here, the cluster number M is set such that the larger R is set, the smaller value M becomes.

First, an initial value of the first cluster is determined by $$Q_1 = \frac{1}{N} \sum_{i=1}^{N} \Omega_i \qquad \text{Equation 27}$$

where $\Omega_i$ is an $i^{th}$ row vector in a matrix $\Omega$. Here, as in Equation 15, $\Omega_i$ corresponds to the temporal motion trajectories of the pixels i shown by Equation 2. Next, as shown by Equation 28, a cluster which is the minimum distance is selected from among clusters $Q_1$ to $Q_{m-1}$ for each of N $\Omega_i$, then $Q_{arg\ max\_min}$ which is the maximum distance in $\Omega_i$ where the cluster is the minimum distance is selected, and initial values of clusters subsequent to the first are set for initial values of new clusters as follows. This is repeated from m=2 to M.

$$Q_m = \Omega_{arg\ max\_min} \qquad \text{Equation 28}$$

This process is a process of setting data which is the maximum distance among data belonging to a cluster as an initial value of a new cluster, and allows the initial value of a cluster to be distributed more widely so that a problem that clustering a data distribution cannot be properly performed due to concentration of clusters at one point, and the like, can be prevented.

Note that a distance between the cluster $Q_m$ and $\Omega_i$ which is used for calculating the minimum distance in the clusters $Q_1$ to $Q_{m-1}$ is calculated using a KL divergence as follows $$J_{mn} = KL(\Omega_n, \mu Q_m)$$ Equation 29

As stated above, initial values of the clusters to $Q_1$ to $Q_M$ can be determined.

Next, in step S803, the nonlinear space processing unit 104 performs clustering on each of N $\Omega_i$. Which clusters $Q_1$ to $Q_M$ N $\Omega_i$ belongs to is determined using the KL divergence as in Equation 29.

Here, each $\Omega_i$ comes to belong to the cluster $Q_m$ where the KL divergence is minimum.

Next, the nonlinear space processing unit 104 updates the cluster $Q_m$ as in the following equation using a result of the clustering on N $\Omega_i$ $$Q_m^{new} = \frac{1}{C} \sum_{c_m=1}^{C_m} \Omega$$ Equation 30 where $\Omega_{c_m}$ is $\Omega_i$ which belongs to the cluster $\Omega_m$, and $C_m$ is the number of $\Omega_i$ which belongs to the cluster $Q_m$. Repeating the step of step S803 a fixed number of times allows determination of which cluster $\Omega_m \Omega_i$ belongs to. It should be noted that $\Omega_i$ and the temporal motion trajectories $x^i$ of the pixels i are in a one-to-one corresponding relation. That is to say, since $\Omega_i$ corresponds to the temporal motion trajectories of the pixels i shown by Equation 2, when the cluster $\Omega_m$ to which $\Omega_i$ belongs is determined, segmentation would be performed on the temporal motion trajectories $x^i$ of the pixels i.

Figure 10:
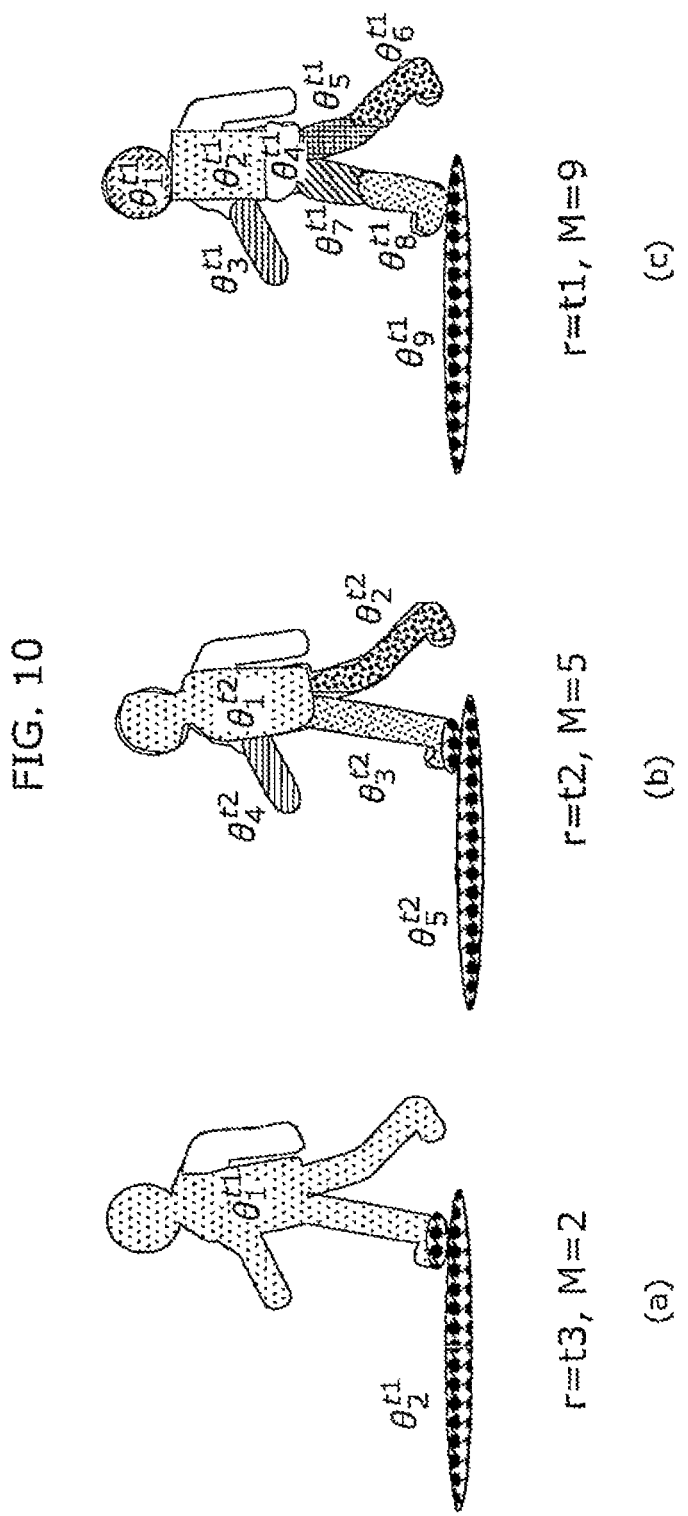
FIG. 10 is a diagram showing an example of detection and segmentation performed by a nonlinear space processing unit according to the second modification of the first embodiment of the present invention.

An example where $\Omega^r$ is created with respect to r=t1, t2, t3 (note that, t1<t2<t3) and segmentation is performed on data $\Omega_i$ in the nonlinear space respectively, assuming cluster number M=9, M=S, and M=2, will be described with reference to FIG. 10 (a) to (c). A result of the segmentation in the case of r=t3 and M=2 is that the data is segmented into a region of a person excluding an arm region on one side and other region. Moreover, in the case of r=t2 and M=S, the data is segmented into a head region and a body region as one region and respective leg regions. Further, in the case of r=t3 and M=9, the same result of detection and segmentation as in FIGS. 7 (a) and (b) is obtained. In this way, an advantage of the present modification is that preparing $\Omega^r$ in plural number allows the segmentation to be performed at a different level.

It should be noted that the reason why the data is not segmented into the arm region on one side is that temporal motion trajectories of pixels i (Equation 2) included in the arm region are not used as inputs as occlusion occurs in tracking pixels. Furthermore, what corresponds to each segment region as in the first embodiment is not only a region on one image but also a result of tracking pixels over temporally successive images. That is to say, performing the segmentation in the reduced nonlinear space allows the detection and segmentation as a result of temporally tracking regions of an articulated body moving in the image.

Furthermore, since it is not necessary to set candidate regions of a person as preprocessing, there is no failure in segmentation caused by a mistake in detecting the candidate regions of the person. Further, although, unlike the first embodiment, an effect of speeding up caused by dimensionality reduction is small in the present modification, since the same method can be used for rough segmentation and fine segmentation as shown in FIG. 10(a) to (c), there is an advantage that the detection of the person and segmentation for the regions of the person can be performed simultaneously as shown by the first embodiment and the first modification of the first embodiment. As described above, it is possible to detect the object such as a moving person with its deformation and perform the segmentation on the regions.

Third Modification of First Embodiment

Figure 11:
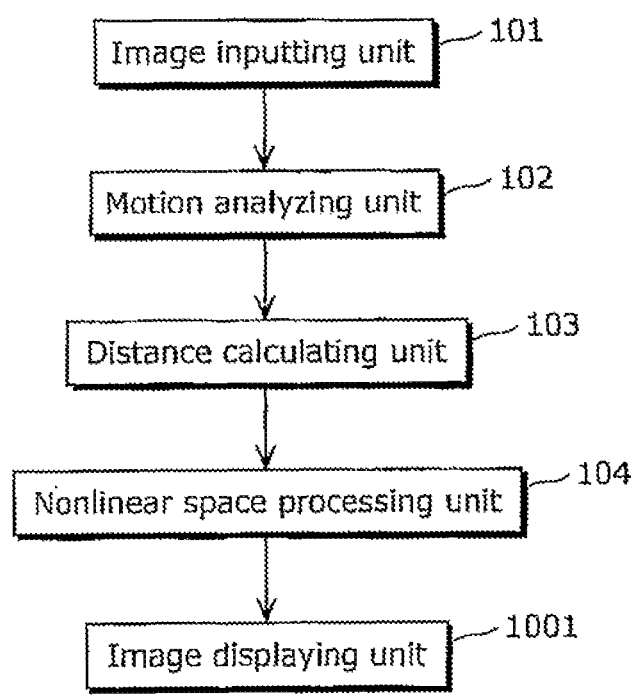
FIG. 11 is a diagram showing a structural example of an image processing apparatus according to a third modification of the first embodiment of the present invention.

Next, an image processing apparatus according to a third modification of the first embodiment of the present invention will be described. Here, an example where a function for displaying the result of detecting the object and performing segmentation on the regions in the first embodiment as an image is added will be described. As shown in FIG. 11, an image displaying unit 1001 is added to such image processing apparatus according to the third modification which includes the image inputting unit 101, the motion analyzing unit 102, and the nonlinear space processing unit 104, and accordingly the image processing apparatus can display, as an image, segmented regions on a monitor and the like.

As shown in FIG. 7 (b), the image displaying unit 1001 separates segment regions on an image which correspond to segment regions $\theta_m$ by color, allows segmented regions to be distinguished respectively, and displays them on the monitor and the like. As a matter of course, each region may be displayed differentially. Here, the temporal motion trajectories of the pixels i shown by Equation 2 correspond to any segment region $\theta_m$. Consequently, when pixels on an image are selected based on temporal motion trajectories of pixels i belonging to a segment region $\theta_m$ and color coding is performed based on a segment region number m, it is easy to display segment regions on the image.

Fourth Modification of First Embodiment

Figure 12:
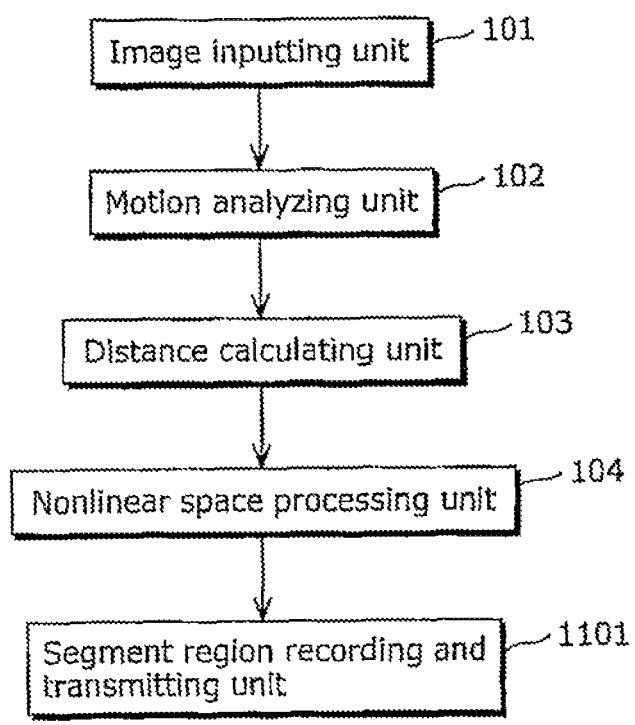
FIG. 12 is a diagram showing a structural example of an image processing apparatus according to a fourth modification of the first embodiment of the present invention.

Next, an image processing apparatus according to a fourth modification of the first embodiment of the present invention will be described. Here, an example where a function for recording and transmitting, for each segment region, the result of detecting the object and performing segmentation on the regions in the first embodiment is added will be described. As shown in FIG. 12, such image processing apparatus according to the fourth modification which includes the image inputting unit 101, the motion analyzing unit 102, and the nonlinear space processing unit 104 can be realized by adding a segment region recording and transmitting unit 1101.

Similar to the case of image displaying, as a result of the segmentation, the segment region recording and transmitting unit 1101 separately records and transmits images according to a segment region number m. Moreover, motion information can be reduced by averaging motion information belonging to each segment as follows. Although normally it is necessary to hold motion information for each pixel, when the following process is performed, it is only necessary to hold one piece of motion information for one segment. For example, when a motion vector of a pixel i ($u_t^i$, $v_t^i$) is used as motion information, motion information which is averaged for each segment can be calculated as follows $$u_t^m = \frac{1}{C_m} \sum_{c_m=1}^{C_m} u_t^{c_m} \qquad \text{Equation 31}$$

$$v_t^m = \frac{1}{C_m} \sum_{c_m=1}^{C_m} v_t^{c_m} \qquad \text{Equation 32}$$

where $C_m$ is the number of pixels which belong to a segment region $\theta_m$ or the number of temporal motion trajectories of pixels. $u_t^{c_m}, v_t^{c_m}$ are respectively a motion vector of a pixel which belongs to a segment region $\theta_m$.

It should be noted that in the case where motion information is reduced using affine motion, instead of Equations 31 and 32, an average value of a pixel location to which a pixel is moved based on the affine motion may be calculated. As described above, it is possible to record and transmit the segment region while reducing the motion information of the pixel.

Second Embodiment

Figure 13:
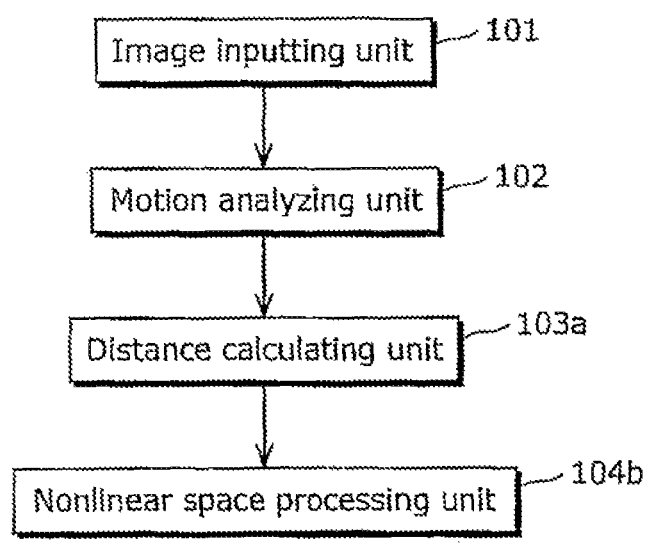
FIG. 13 is a diagram showing a structural example of an image processing apparatus according to a second embodiment of the present invention.

Next, a method for realizing detection and segmentation more highly accurately using two or more distance functions will be described as a second embodiment. As shown in FIG. 13, an image processing apparatus includes the image inputting unit 101, the motion analyzing unit 102, a distance calculating unit 103a, and a nonlinear space processing unit 104a. The image inputting unit 101 and the motion analyzing unit 102 are same as in the first embodiment, their descriptions are not given here.

Although the distance calculating unit 103a and the nonlinear space processing unit 104a each basically have the same function as the distance calculating unit 103 and the nonlinear space processing unit 104 of the first embodiment, a point that additional parameters are used by the former units for performing a process more highly accurately differs from the first embodiment. The following mainly describes the point different from the first embodiment.

The distance calculating unit 103a calculates a distance matrix for each distance function using a distance function for a distance between pixels on an image and its fluctuation and a distance function for an angle between pixels and its fluctuation.

After projecting the two distance matrices calculated by the distance calculating unit 103a into respective different nonlinear spaces, the nonlinear space processing unit 104a performs clustering by integrating the two different nonlinear spaces.

Figure 14:
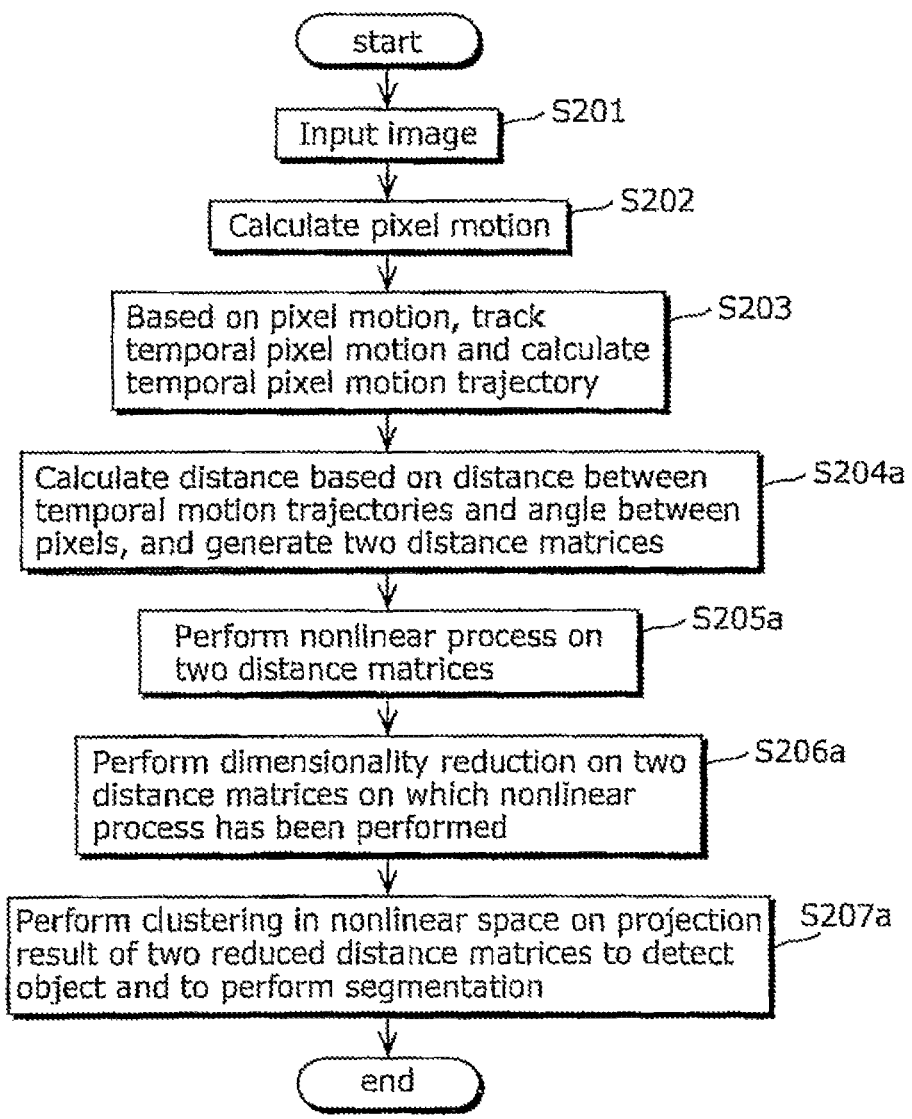
FIG. 14 is a flow chart showing a basic operation of the image processing apparatus according to the second embodiment of the present invention.

Here, a description is given along the flow chart of processing shown in FIG. 14. First, as steps S201 to S203 are same as in the first embodiment, their descriptions are not given here.

Next, in step S204, the distance calculating unit 103a calculates a distance matrix including a similarity of motions of pixels using the temporal motion trajectory of the pixel i calculated by Equation 2.

Here, in addition to the distance f(i, j) shown by Equation 3, an example where a distance $f_2(i, j)$ based on an angle between the pixel i and a pixel j is used as the second distance function will be described.

$$f_2(i,j) = \text{a\_mean}_{ij} + w_a \cdot \sqrt{\text{a\_var}_{ij}} \qquad \text{Equation 33}$$

where $w_a$ is a weighting factor and a parameter set by a designer. Furthermore, the following expresses $\text{a\_mean}_{ij}$ and $\text{a\_var}_{ij}$ $$\text{a\_mean}_{ij} = \frac{1}{T}\sum_{i=1}^{T} a_{ij}^t \qquad \text{Equation 34}$$

$$\text{a\_var}_{ij} = \frac{1}{T}\sum_{i=1}^{T}(a_{ij}^t - \text{a\_mean}_{ij})^2 \qquad \text{Equation 35}$$

where $$a_{ij} = \arctan\left(\frac{y_t^i - y_t^j}{x_t^i - x_t^j}\right) \qquad \text{Equation 36}$$

As stated above, the similarity of the motions of the pixels using the angle between the pixel i and the pixel j and its fluctuation component can be expressed. This allows not only a rigid body but also deformation, especially including a rotational motion, of an articulated object and the like to be captured.

It should be noted that as long as $f_2(i, j)$ is a distance value which allows evaluation of the similarity of the motions of the pixels, any value can be used for $f_2(i, j)$, and Equation 37 or Equation 38 using the affine parameter $A_t^i$ Equation 1 may be, for example, used instead of Equations 34 to 39. Equation 37 can express the similarity of the motions of the pixels using an angle difference between motion vectors of the pixel i and the pixel j and its fluctuation component. This allows motion change including rotation to be captured. Equation 38 can express the similarity of the motions of pixels using a difference in affine parameters of adjacent blocks of the pixel i and the pixel j and its fluctuation component. This allows the motion change including rotation, translation movement, and scale transition to be captured.

$$f_2(i, j) = \text{a\_mean}_{ij} + w_o \cdot \sqrt{\text{a\_var}_{ij}} \qquad \text{Equation 37}$$

$$\text{a\_mean}_{ij} = \frac{1}{T-1}\sum_{i=1}^{T-1} a_{ij}^t$$

$$\text{a\_var}_{ij} = \frac{1}{T-1}\sum_{i=1}^{T-1}(a_{ij}^t - \text{a\_mean}_{ij})^2$$

$$a_{ij}^t = \arctan\left(\frac{y_{t+1}^i - y_t^i}{x_{t+1}^i - x_t^i}\right) - \arctan\left(\frac{y_{t+1}^j - y_t^j}{x_{t+1}^j - x_t^j}\right)$$

$$f_3(i, j) = \text{a\_mean}_{ij} + w_o \cdot \sqrt{\text{a\_var}_{ij}} \qquad \text{Equation 38}$$

$$\text{a\_mean}_{ij} = \frac{1}{T-1}\sum_{i=1}^{T-1} a_{ij}^t$$

$$\text{a\_var}_{ij} = \frac{1}{T-1}\sum_{i=1}^{T-1}(a_{ij}^t - \text{a\_mean}_{ij})^2$$

$$a_{ij}^t = \|A_t^i - A_t^j\|$$

Next, in step S205a, the nonlinear space processing unit 104a calculates $g_{new}(i, j)$ corresponding to the distance f(i, j) of Equation 3 using the processes shown by Equations 7 to 10. Further, apart from the above calculation, $g_{2\_new}(i, j)$ corresponding to the distance $f_2(i, j)$ based on the angle between the pixel i and the pixel j is calculated. That is to say, two nonlinearized distances are separately calculated. Although the distance between the pixels and the angle between the pixels are described here, three or more distances may be calculated using a distance which expresses a similarity of motions of other pixels.

Next, in step S206a, the nonlinear space processing unit 104a generates $G_2$ from the distance $g_{2\_new}(i, j)$ separately nonlinearized in the same manner as in Equation 11. Further, the processes shown by Equations 12 to 16 are similarly performed on $G_2$, $G_2$ is projected into the dimensionality-reduced space, like Equation 16, and $z_{2\_p2}{}^i$ is calculated.

Next, in step S207a, the nonlinear space processing unit 104a integrates $z^i_p$ calculated by Equation 16 and $z_{2\_p2}{}^i$ performs clustering so as to detect an object and perform segmentation on the object simultaneously. Specifically, it can be realized by rewriting Equations 19 and 20 as follows $$\overline{z_m} = \begin{bmatrix} \overline{z_1^m} \\ \vdots \\ \overline{z_P^m} \\ \overline{z_{2\_1}^m} \\ \vdots \\ \overline{z_{2\_P}^m} \end{bmatrix} \quad \text{Equation 39}$$

$$Z_m = \frac{1}{C_m} \sum_{c_m=1}^{C_{mk}} \begin{bmatrix} z_1^{c_m} - \overline{z_1^m} \\ \vdots \\ z_P^{c_m} - \overline{z_P^m} \\ z_{2\_1}^{c_m} - \overline{z_{2\_1}^m} \\ \vdots \\ z_{2\_P}^{c_m} - \overline{z_{2\_P}^m} \end{bmatrix} \quad \text{Equation 40}$$

$$\begin{bmatrix} z_1^{c_m} - \overline{z_1^m} & \cdots & z_P^{c_m} - \overline{z_P^m} & z_{2\_1}^{c_m} - \overline{z_{2\_1}^m} & \cdots & z_{2\_P}^{c_m} - \overline{z_{2\_P}^m} \end{bmatrix}$$

Hereinafter, Equations 21 to 24 in step S207a are same as before, their descriptions are not given.

As described above, the image processing apparatus according to the present embodiment calculates the distance matrix for each distance function using the distance function for the distance between the pixels on the image and its fluctuation and the distance function for the angle between the pixels and its fluctuation, integrates the two different nonlinear spaces and performs clustering after projecting each distance matrix into the respective nonlinear spaces, so as to detect and perform segmentation more highly accurately as a result of temporally tracking the regions of the physical body moving in the image. Further, using the angle between the pixels on the image and its fluctuation as a distance function allows a rotational motion especially caused by joint motion to be captured more properly. Furthermore, since it is not necessary to set candidate regions of a person as preprocessing, there is no failure in segmentation caused by a mistake in detecting the candidate regions of the person. As stated above, it is possible to detect an object such as a moving person with its deformation and perform the segmentation on the regions more highly accurately.

Third Embodiment

Figure 15:
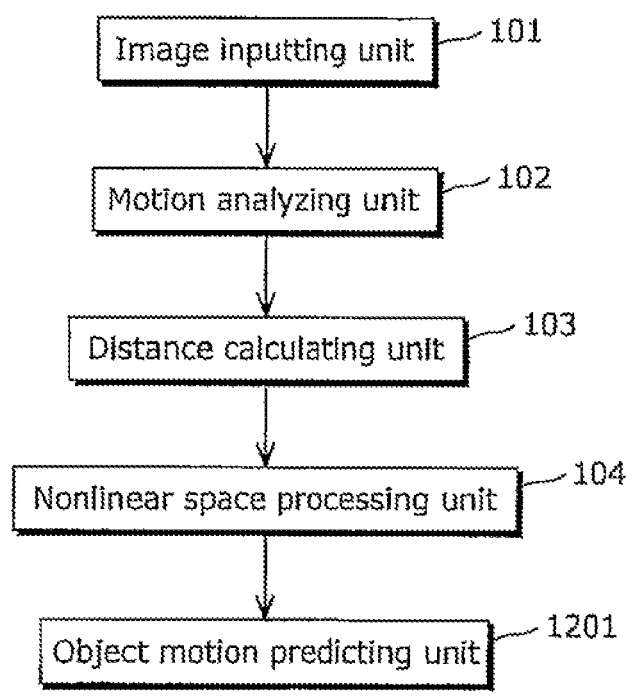
FIG. 15 is a diagram showing a structure of an image processing apparatus according to a third embodiment of the present invention.

In the present embodiment, an image processing apparatus to which a function for predicting a motion of an object based on a result of detecting and performing segmentation on the object using the image processing method described in the first embodiment is added will be described. As shown in FIG. 15, an object motion predicting unit 1201 is added to the image processing apparatus which includes the image inputting unit 101, the motion analyzing unit 102, the distance calculating unit 103, and the nonlinear space processing unit 104, and accordingly the image processing apparatus comes to have the function for predicting the motion of the object.

Figure 16:
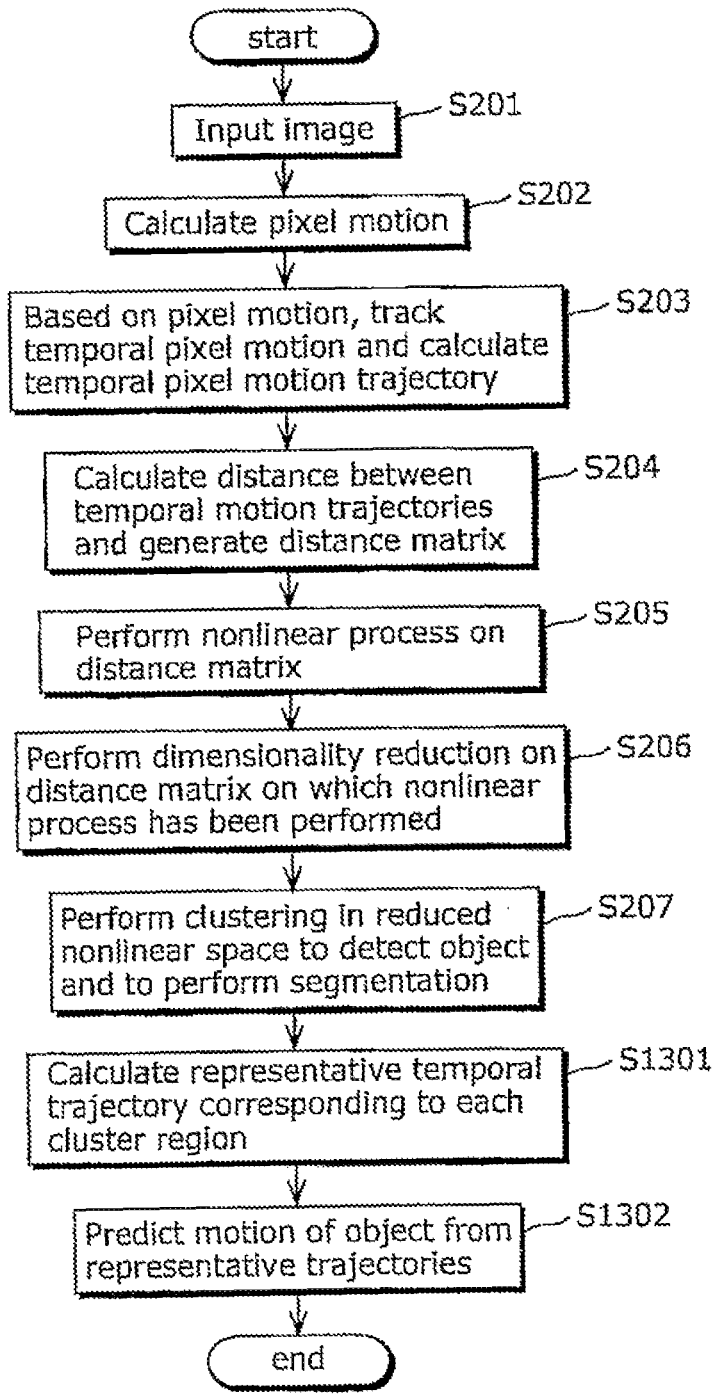
FIG. 16 is a flow chart showing a basic operation of the image processing apparatus according to the third embodiment of the present invention.

The object motion predicting unit 1201 calculates a representative trajectory from temporal motion trajectories of pixels included in each segment based on the result of the segmentation, and predicts the motion of the object according to the representative trajectory. FIG. 16 shows the flow chart of processing according to a third embodiment. As steps S201 to S206 are same as in the first embodiment, their descriptions are not given here.

Next, in step S1301, the object motion predicting unit 1201 obtains a representative point and a representative trajectory of a cluster using the result of the segmentation performed in step S207 as follows. Here, temporal motion trajectories of pixels corresponding to the data $z_{c_m}$ in the nonlinear space which belongs to the segment region $\theta_m$ shown in FIG. 7(a) and (b) and FIG. 8 are expressed as $x^{c_m}$. As mentioned before, since data $z^i_p$ in the nonlinear space and the temporal motion trajectories $x^i$ of the pixels i are in a one-to-one corresponding relation, when data $z_{c_m}$ belonging to a cluster region $\theta_m$ is selected, temporal motion trajectories $x^{c_m}$ of corresponding pixels are automatically determined. Further, as in the following equation, a representative temporal motion trajectory is obtained for each cluster region $\theta_m$.

Although an example where an average temporal motion trajectory is calculated as a representative temporal motion trajectory here, weighting for each of the temporal motion trajectories $x^{c_m}$ of the pixels, and the like, may be performed or a temporal motion trajectory of a pixel corresponding to a gravity center of a cluster on an image may be used as the representative temporal motion trajectory.

$$\overline{x^m} = \frac{1}{C_m} \sum_{c=1}^{C_m} x^{c_m} \quad \text{Equation 41}$$

Figure 17:
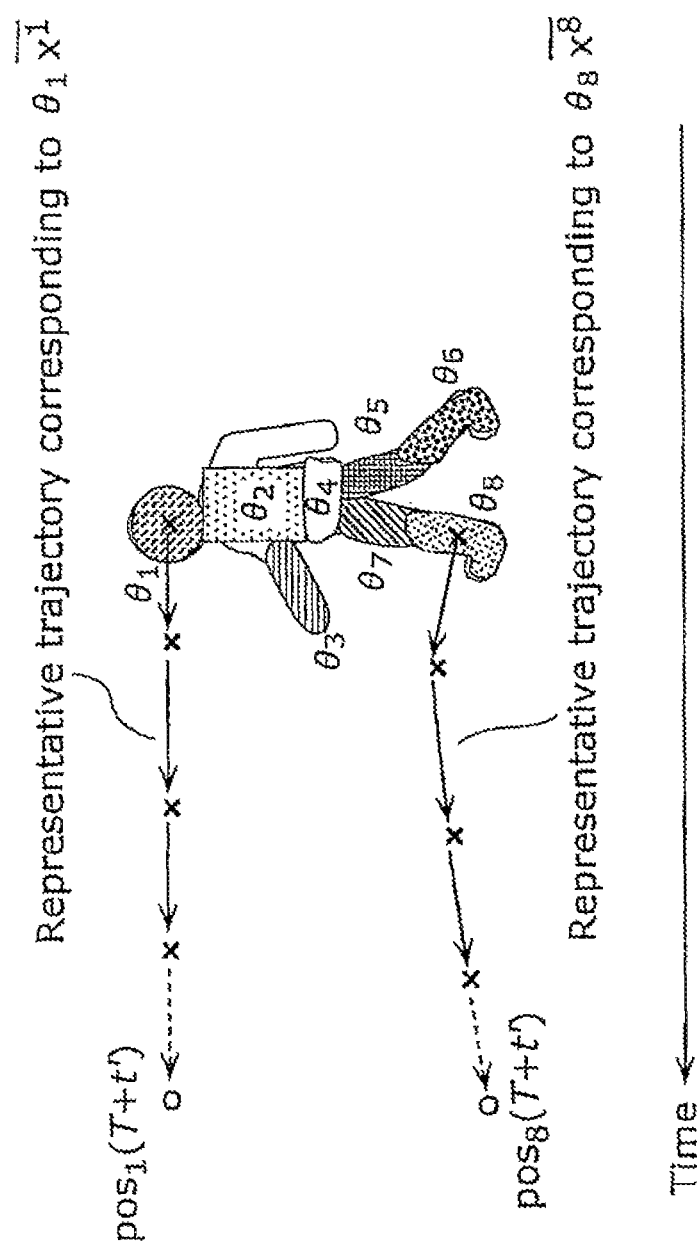
FIG. 17 is a diagram showing an example of motion prediction according to the third embodiment of the present invention.

FIG. 17 shows an example where a representative temporal motion trajectory is obtained for each cluster $\theta_m$ based on Equation 41. It should be noted that, in consideration of viewability, only representative temporal motion trajectories regarding a cluster region $\theta_1$, corresponding to a head and a cluster region $\theta_8$ corresponding to a crus are shown. Crosses in the figure are elements of $\overline{x^m}$ respectively corresponding to time t and each indicates a pixel location. Further, as shown by Equations 3 and 33, since segmentation by clustering in the nonlinear space is performed in consideration of a similarity of motions of pixels, calculation is possible only using temporal motion trajectories of pixels having similar motions. Accordingly, compared to a method for simply obtaining an average of motion trajectories of adjacent pixels, representative temporal motion trajectories can be obtained more highly accurately. In this way, obtaining the representative motion trajectory for each cluster region allows a motion for each region to be expressed accurately and easily.

Next, in step S1302, the object motion predicting unit 1201 predicts a location of the object at time later than time T based on the representative temporal motion trajectories calculated in step S1301.

First, an example where acceleration is calculated from the representative temporal motion trajectories and a location of the object after T+1 is predicated will be described. In the case where three or more time series images are inputted, an acceleration vector $s^m$ can be obtained for each representative temporal motion trajectory $\overline{x^m}$ as in the following equation $$s_{t+1}{}^m = \{u_{t+1}{}^{m1} - u_t{}^m\} - \{u_t{}^m - u_{t-1}{}^n\} \quad \text{Equation 42}$$

where $u_t^m$ is a motion vector, and can be expressed as in the following equation $$u_t^m = (u_t^m, v_t^m) \quad \text{Equation 43}$$

As shown by dashed arrows and circles in FIG. 17, locations of regions of the object at time T+t' $pos_m(T+t')$ can be predicated for each region of the object using the acceleration vector of Equation 43 as follows. Although the regions of the object are used as the example here, it is possible to predict a location for each object such as the bicycle and the pedestrian described in FIG. 8.

$$pos_m(T+t') = pos_m(T) + t' u_T^m + \frac{1}{2} t'^2 s_T^m \quad \text{Equation 44}$$

This allows prediction which takes the acceleration into consideration. In the case where a motion suddenly becomes rapid or suddenly stops, it is possible to predict the location of the object with such acceleration. Moreover, the affine parameter may be used instead of the motion vector. The affine parameter can express a motion including a rotational motion and is suitable for expressing rotational motions of an arm and a leg.

Further, instead of the above-mentioned motion vector and acceleration, directly fitting $N^m$ order function to the representative temporal motion trajectory $x^m$ is possible. In the case where T time series images are inputted, fitting $N^{th}$ order function to location information included in $x^m$ on T images is possible. In this way, a location on the image at time (T+t') $pos_m(T+t')$ can be estimated so that it fits a value of the function on which fitting is performed. Specifically, since fitting with the function allows a smoother motion to be expressed, more highly accurate prediction becomes possible. As a matter of course, the prediction for locations on these images can be used for time interpolation.

As described above, according to the present embodiment, since the temporal motion trajectories of the pixels having similar motions can be calculated as the same cluster, the representative temporal motion trajectory can be obtained highly accurately. The motion of each region of especially the articulated object and the like can be expressed, and it is possible to predict the locations of the regions of the object highly accurately without setting the candidate regions of the person as preprocessing.

Although the image processing method and the image processing apparatus according to the present invention have been described based on the embodiments and the modifications, the present invention is not limited to these embodiments and modifications. The present invention includes an embodiment realized by applying, to each embodiment, within a scope of the gist of the present invention, various modifications conceivable to a person with an ordinary skill in the art.

Moreover, the present invention includes an embodiment realized by arbitrarily combining characteristic components of each embodiment.

INDUSTRIAL APPLICABILITY

The present invention can be used for an image processing apparatus which performs segmentation on an image including an object such as a moving person with its deformation, based on motions of blocks having one or more pixels in images, so as to detect the object, for example an image processing apparatus to be included in a motion analysis device, a monitoring device, and AV equipment such as a video camera and TV.

The invention claimed is:

1. An image processing method for performing segmentation on an image including an articulated object having a shape that changes, based on motions of blocks, each of the blocks being comprised of one pixel or adjacent pixels, said image processing method comprising:
   an image receiving step of receiving temporally successive images;
   a motion analyzing step of calculating the motions of the blocks using at least two temporally different images and calculating, based on the calculated motions of the blocks, temporal motion trajectories of the blocks in the temporally successive images, each of the temporal motion trajectories showing a series of positions through which a corresponding one of the blocks moves on the temporally successive images;
   a distance calculating step of calculating first distances based on (a) a difference of positions, (b) an angle, (c) a difference of an angle of motion or (d) a change of motion, between a temporal motion trajectory of a block i and a temporal motion trajectory of a block other than the block i calculated in said motion analyzing step, each of the calculated first distances indicating a similarity of the motions of the blocks; and
   a nonlinear space processing step of projecting the first distances calculated in said distance calculating step into a nonlinear space by calculating nonlinearized distances and transforming the nonlinearized distances into vectors by performing dimensionality reduction and segmentation of the vectors, wherein the nonlinearized distances are calculated by converting the first distances into geodesic distances using one of the following alternatives:
   (i) calculating second distances by infinitizing each of the first distances when the first distance is greater than k-th smallest of the first distances and calculating geodesic distances using the second distances;
   (ii) calculating the second distances by infinitizing each of the first distances when the first distance is greater than a threshold and calculating the geodesic distances using the second distances; and
   (iii) calculating the second distances by transforming each of the first distances using an exponential function and calculating the geodesic distances using the second distances,
   wherein, in said distance calculating step, using two distance functions, distances are calculated for each of pairs of the blocks, and
   wherein, in said nonlinear space processing step, each of the distances is transformed into vectors in respective different nonlinear spaces, and segmentation of concatenated vectors is performed which is a concatenation of two vectors of the different nonlinear spaces.

2. The image processing method according to claim 1, wherein, in said nonlinear space processing step, the segmentation of the vectors is performed based on a mean of the vectors, or the mean and a covariance of the vectors.

3. The image processing method according to claim 1, wherein, in said nonlinear space processing step, the calculating of the nonlinearized distances is performed by converting Euclidean distances into the geodesic distances.

4. The image processing method according to claim 1, wherein, in said nonlinear space processing step, the dimensionality reduction is performed by calculating an eigenvector of the nonlinearized distances.

5. The image processing method according to claim 1, wherein, in said motion analyzing step, one of a two-dimensional motion vector and an affine parameter is calculated as the motions of the blocks.

6. The image processing method according to claim 1, further comprising an image displaying step of displaying, on one of the temporally successive images received in said image receiving step, a result of the segmentation performed in the nonlinear space.

7. The image processing method according to claim 1, wherein, in said nonlinear space processing step, at least two different moving physical bodies included in the temporally successive images received in said image receiving step are detected based on a result of the segmentation performed in the nonlinear space.

8. The image processing method according to claim 1, further comprising an object motion predicting step of calculating a representative trajectory from the temporal motion trajectories of blocks included in each segment obtained by the segmentation, based on a result of the segmentation performed in the nonlinear space, and predicting a new position of an object according to the representative trajectory.

9. The image processing method according to claim 1, further comprising a recording and transmitting step of identifying a segment on one of the temporally successive images received in said image receiving step, based on a result of the segmentation performed in the nonlinear space, and recording or transmitting the result corresponding to the identified segment.

10. An image processing apparatus for performing segmentation on an image including an articulated object having a shape that changes, based on motions of blocks, each of the blocks being comprised of one pixel or adjacent pixels, said image processing apparatus comprising:

an image receiving unit operable to receive temporally successive images;

a motion analyzing unit operable to calculate the motions of the blocks using at least two temporally different images and to calculate, based on the calculated motions of the blocks, temporal motion trajectories of the blocks in the temporally successive images, each of the temporal motion trajectories showing a series of positions through which a corresponding one of the blocks moves on the temporally successive images;

a distance calculating unit operable to calculate first distances based on (a) a difference of positions, (b) an angle, (c) a difference of an angle of motion or (d) a change of motion, between a temporal motion trajectory of a block i and a temporal motion trajectory of a block other than the block i calculated by said motion analyzing unit, each of the calculated first distances indicating a similarity of the motions of the blocks; and a nonlinear space processing unit operable to project the first distances calculated by said distance calculating unit into a nonlinear space by calculating nonlinearized distances and transforming the nonlinearized distances into vectors by performing dimensionality reduction and segmentation of the vectors, wherein the nonlinearized distances are calculated by converting the first distances into geodesic distances using one of the following alternatives:

(i) calculating second distances by infinitizing each of the first distances when the first distance is greater than k-th smallest of the first distances and calculating the geodesic distances using the second distances;

(ii) calculating the second distances by infinitizing each of the first distances when the first distance is greater than a threshold and calculating the geodesic distances using the second distances; and (iii) calculating the second distances by transforming each of the first distances using an exponential function and calculating the geodesic distances using the second distances, wherein said distance calculating unit, using two distance functions, calculates distances for each of pairs of the blocks, and wherein said nonlinear space processing unit transforms each of the distances transformed into vectors in respective different nonlinear spaces, and performs segmentation of concatenated vectors which is a concatenation of two vectors of the different nonlinear spaces.

11. A non-transitory computer-readable recording medium having a program recorded thereon, said program causing a computer to execute the image processing method of claim 1.

12. The image processing method according to claim 1, wherein a position through which the block i moves on an image at a time t is $(x_t^i, y_t^i)$ and a number of images used for calculating a temporal motion trajectory $x^i$ of the block i is T, the temporal motion trajectory $x^i$ being expressed as $x^i = x_1^i, y_1^i, \ldots, x_t^i, y_t^i, \ldots, x_T^i, y_T^i$).

* * * * *